US008836283B2

(12) United States Patent
Berger

(10) Patent No.: US 8,836,283 B2
(45) Date of Patent: Sep. 16, 2014

(54) BATTERY RECHARGING BASE STATION

(71) Applicant: Karl Hermann Berger, Clifton Beach (AU)

(72) Inventor: Karl Hermann Berger, Clifton Beach (AU)

( * ) Notice: Subject to any disclaimer, the term of this patent is extended or adjusted under 35 U.S.C. 154(b) by 0 days.

(21) Appl. No.: 13/952,900

(22) Filed: Jul. 29, 2013

(65) Prior Publication Data
US 2014/0062406 A1   Mar. 6, 2014

Related U.S. Application Data

(63) Continuation-in-part of application No. 13/581,684, filed on Aug. 29, 2012.

(51) Int. Cl.
H02J 7/00    (2006.01)

(52) U.S. Cl.
CPC .................... *H02J 7/0044* (2013.01)
USPC ........... 320/115; 320/113; 320/107; 29/401.1

(58) Field of Classification Search
CPC ...... H02J 7/0042; H02J 7/0044; H02J 7/0045
USPC .................. 320/115, 113; 29/401.1
See application file for complete search history.

(56) References Cited

U.S. PATENT DOCUMENTS

| 3,938,018 | A | 2/1976 | Dahl |
| 4,357,648 | A | 11/1982 | Nelson |
| 5,659,236 | A * | 8/1997 | Hahn ........................... 320/111 |
| 6,204,632 | B1 * | 3/2001 | Nierescher et al. ........... 320/116 |
| 6,296,367 | B1 | 10/2001 | Parsons et al. |
| 2002/0158605 | A1 | 10/2002 | Sharrah et al. |

* cited by examiner

Primary Examiner — David Bryant
Assistant Examiner — Ruth G Hidalgo-Hernande
(74) Attorney, Agent, or Firm — David A. Guerra

(57) ABSTRACT

The present invention is related to a rechargeable base station system having a base station connected to a DIN rail assembly. The base station has a base featuring side walls, and a receiving unit rotatably connected to the side walls. The receiving unit has an opened end configured to receive a rechargeable device, and at least one electrical contact which contacts the rechargeable device so as to charge the rechargeable device. The DIN rail assembly has power connection elements that provide power from a power source to the base station when the base station is attached to the DIN rail assembly. The base station can include a battery which provides power to charge the rechargeable device when power from the power source is interrupted. Multiple base stations can be connected to the DIN rail assembly thereby allowing for multiple rechargeable devices to be charged from a single DIN rail assembly.

20 Claims, 18 Drawing Sheets

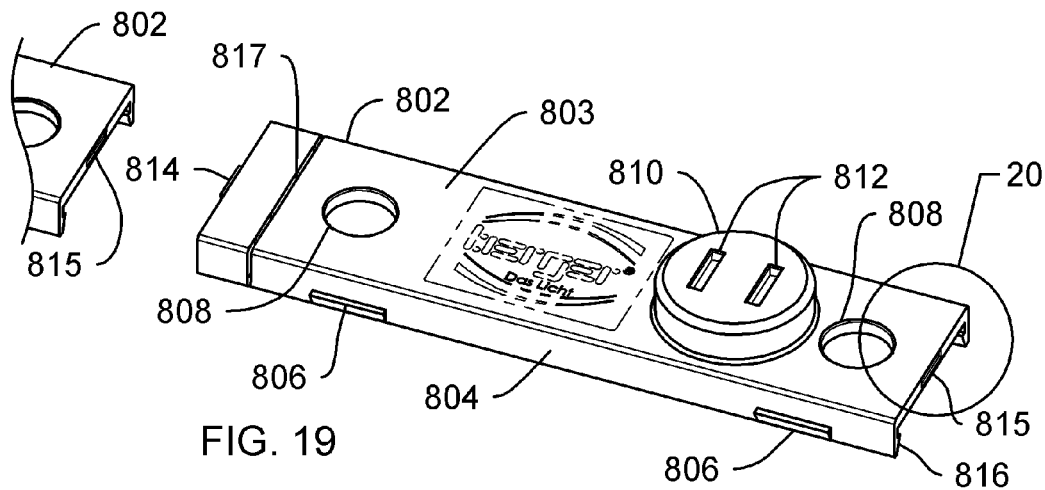
FIG. 19
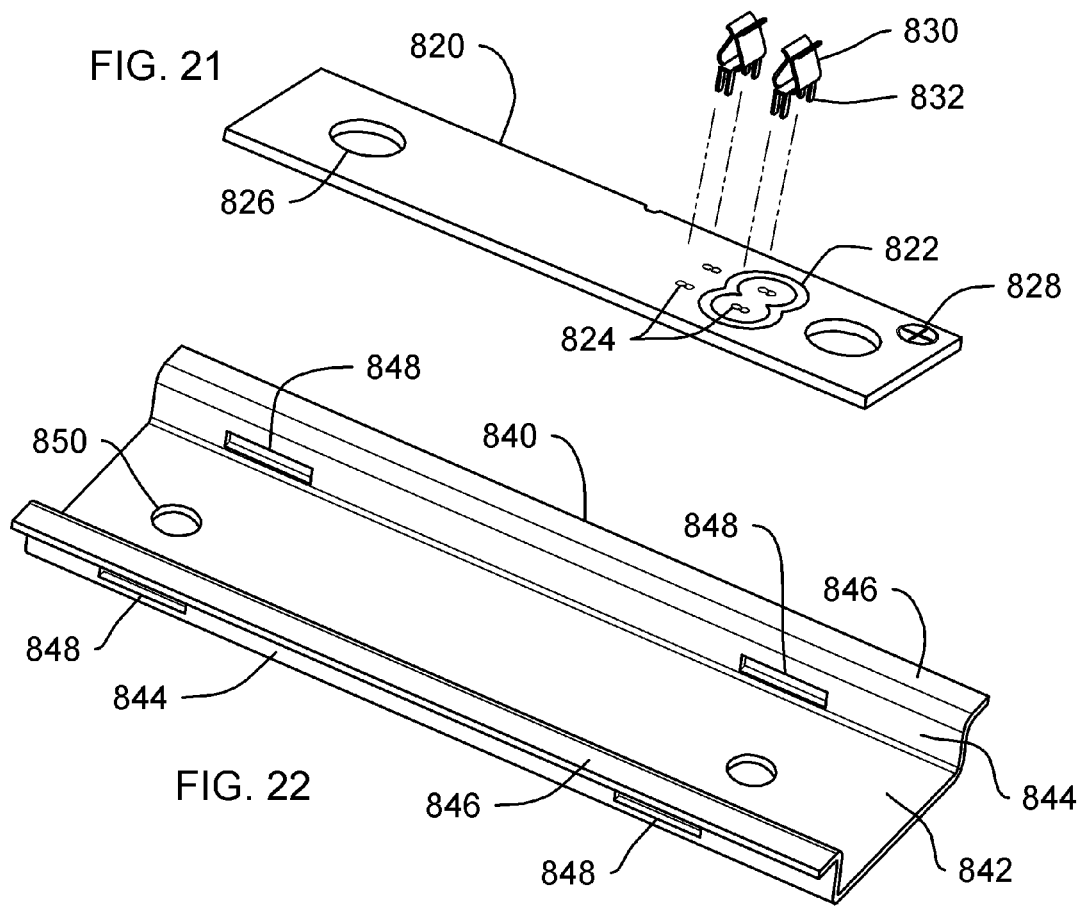
FIG. 21
FIG. 22

BATTERY RECHARGING BASE STATION

CROSS-REFERENCE TO RELATED APPLICATION

This application is a continuation-in-part under 35 U.S.C. §120 based upon co-pending U.S. patent application Ser. No. 13/581,684, filed on Aug. 29, 2012, which is an U.S. national phase application under 35 U.S.C. §371 based upon co-pending International Application No. PCT/AU2011/000582 filed on May 18, 2011. The entire disclosure of the prior applications is incorporated herein by reference.

FEDERALLY SPONSORED RESEARCH

Not applicable

SEQUENCE LISTING OR PROGRAM

Not applicable

BACKGROUND OF THE INVENTION

1. Field of the Invention

The present invention relates to a recharging base station for use in connection with recharging a flashlight battery while enabling the flashlight to remain readily usable.

2. Description of the Prior Art

Commercially available flashlights marketed today employ various battery technologies that can be broadly classified as rechargeable and non-rechargeable. Examples of non-rechargeable battery technologies include cells based on alkaline, lithium, zinc-carbon, and zinc chloride. Examples of rechargeable battery technologies include cells based on lead acid, lithium ion, lithium sulfur, lithium titanate, nickel cadmium, nickel iron, nickel hydrogen, nickel metal hydride, nickel zinc, and polysulfide bromide. Rechargeable battery technologies are generally more environmentally friendly than non-rechargeable battery technologies, as once drained non-rechargeable batteries add to land fill waste and can potentially contaminate soil and water supplies.

Flashlights sold today with non-rechargeable batteries can be outfitted with rechargeable batteries by the user. For example a user may purchase a flashlight with an alkaline based battery technology and replace the batteries with rechargeable battery cells made of nickel metal hydride. Furthermore some manufacturers have offered flashlights bundled with rechargeable batteries.

However, in order to recharge such rechargeable batteries, the users must remove the batteries from the flashlight and set the batteries in a separate charging apparatus. This can be cumbersome and time consuming, and leaves the flashlight inoperable until the batteries are replaced and the flashlight is reassembled.

Manufacturers have therefore recognized a need for recharging flashlight batteries without removing the batteries from a flashlight. For example, manufacturers have designed flashlights that are sold with a base station that can recharge a flashlight when the flashlight is simply deposited in the base station, and without requiring removal of the batteries from the flashlight. Such flashlights are therefore readily usable, even during a charging phase, by simply lifting the flashlight out of the base station and turning the flashlight on.

Many such base stations recharge the battery pack using metallic conductive contact points between the base station, which is plugged into an AC circuit, and the flashlight. Other manufacturers of rechargeable flashlights use inductive charging stations. Inductive charging uses electromagnetic induction, whereby a charger induces a current inside the flashlight which transfers electric power to the batteries. An induction coil in the charger (primary coil) creates an alternating electromagnetic field, and a second induction coil (secondary coil) in the flashlight takes power from the electromagnetic field and converts it back to electrical current to charge the batteries. Essentially two induction coils in close proximity combine to form an electrical transformer.

One example of inductive charging is described in U.S. Pat. No. 3,938,018 to Dahl, where "[a] normal 117-volt, 60 cycle source is converted into a high frequency signal resulting in radiation of a substantial portion of the energy in the signal. A receiving coil is inductively coupled to the radiation over a given distance substantially less than a wave length of the high frequency signal to provide a received signal without the necessity of any electrical wires. The received signal in turn is converted into a D.C. signal and passed to a rechargeable battery for charging. The inductive coupling can be utilized for recharging portable electrical instruments having rechargeable batteries or for charging larger rechargeable batteries such as used in electrically driven vehicles." Thus a flashlight outfitted with such technology does not require external electrical contacts between a base station and the flashlight.

However, commercially available rechargeable flashlights that include a recharging base station are generally more expensive than comparable non-rechargeable flashlights. For example, the Maglite® (a registered trademark of Mag Instrument, Inc.) brand rechargeable flashlights manufactured by Mag Instrument, Inc. generally retail at significantly higher prices than the Maglite® brand non-rechargeable flashlights.

There is therefore a need for an improved method of converting a non-rechargeable flashlight to a rechargeable flashlight. While the above-described devices fulfill their respective, particular objectives and requirements, the aforementioned patents do not describe a recharging base station that allows recharging a flashlight battery while enabling the flashlight to remain readily usable.

Therefore, a need exists for a new and improved recharging base station that can be used for recharging a flashlight battery while enabling the flashlight to remain readily usable. In this regard, the present invention substantially fulfills this need. In this respect, the recharging base station according to the present invention substantially departs from the conventional concepts and designs of the prior art, and in doing so provides an apparatus primarily developed for the purpose of recharging a flashlight battery while enabling the flashlight to remain readily usable.

SUMMARY OF THE INVENTION

In view of the foregoing disadvantages inherent in the known types of recharging base stations now present in the prior art, the present invention provides an improved recharging base station, and overcomes the above-mentioned disadvantages and drawbacks of the prior art. As such, the general purpose of the present invention, which will be described subsequently in greater detail, is to provide a new and improved recharging base station and method which has all the advantages of the prior art mentioned heretofore and many novel features that result in a recharging base station which is not anticipated, rendered obvious, suggested, or even implied by the prior art, either alone or in any combination thereof.

To attain this, the present invention essentially comprises a rechargeable base station system having a base station connected to a DIN rail assembly. The base station has a base including side walls, and a receiving unit rotatably connected to the side walls. The receiving unit has an opened end configured to receive a rechargeable device, and at least one electrical contact which contacts the rechargeable device so as to charge the rechargeable device. The DIN rail assembly has power connection elements that provide power from a power source to the base station when the base station is attached to the DIN rail assembly. The base station can include a battery which provides power to charge the rechargeable device when power from the power source is interrupted.

There has thus been outlined, rather broadly, the more important features of the invention in order that the detailed description thereof that follows may be better understood and in order that the present contribution to the art may be better appreciated.

The DIN rail assembly of the present invention may also include a DIN rail cover strip having a connection unit coupled to the base of the base station, a lower DIN rail configured to receive the DIN rail cover strip, and an inner power rail located between the DIN rail cover strip and the lower DIN rail. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved recharging base station that has all of the advantages of the prior art recharging stations and none of the disadvantages.

It is another object of the present invention to provide a new and improved recharging base station that may be easily and efficiently manufactured and marketed.

An even further object of the present invention is to provide a new and improved recharging base station that has a low cost of manufacture with regard to both materials and labor, and which accordingly is then susceptible of low prices of sale to the consuming public, thereby making such recharging base station economically available to the buying public.

Still another object of the present invention is to provide a new recharging base station that provides in the apparatuses and methods of the prior art some of the advantages thereof, while simultaneously overcoming some of the disadvantages normally associated therewith.

Even still another object of the present invention is to provide a recharging base station for recharging a flashlight battery while enabling the flashlight to remain readily usable. This allows for multiple base stations to be attached single DIN rail assembly, thereby allowing for the charging of multiple devices.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 19 is an exploded perspective view of the DIN rail cover strip of the DIN rail assembly shown in FIG. 18.

FIG. 21 is an exploded perspective view of the inner strip and power connection clips of the DIN rail assembly shown in FIG. 18.

FIG. 22 is a perspective view of the lower DIN rail of the DIN rail assembly shown in FIG. 18.

Figures 1, 2:
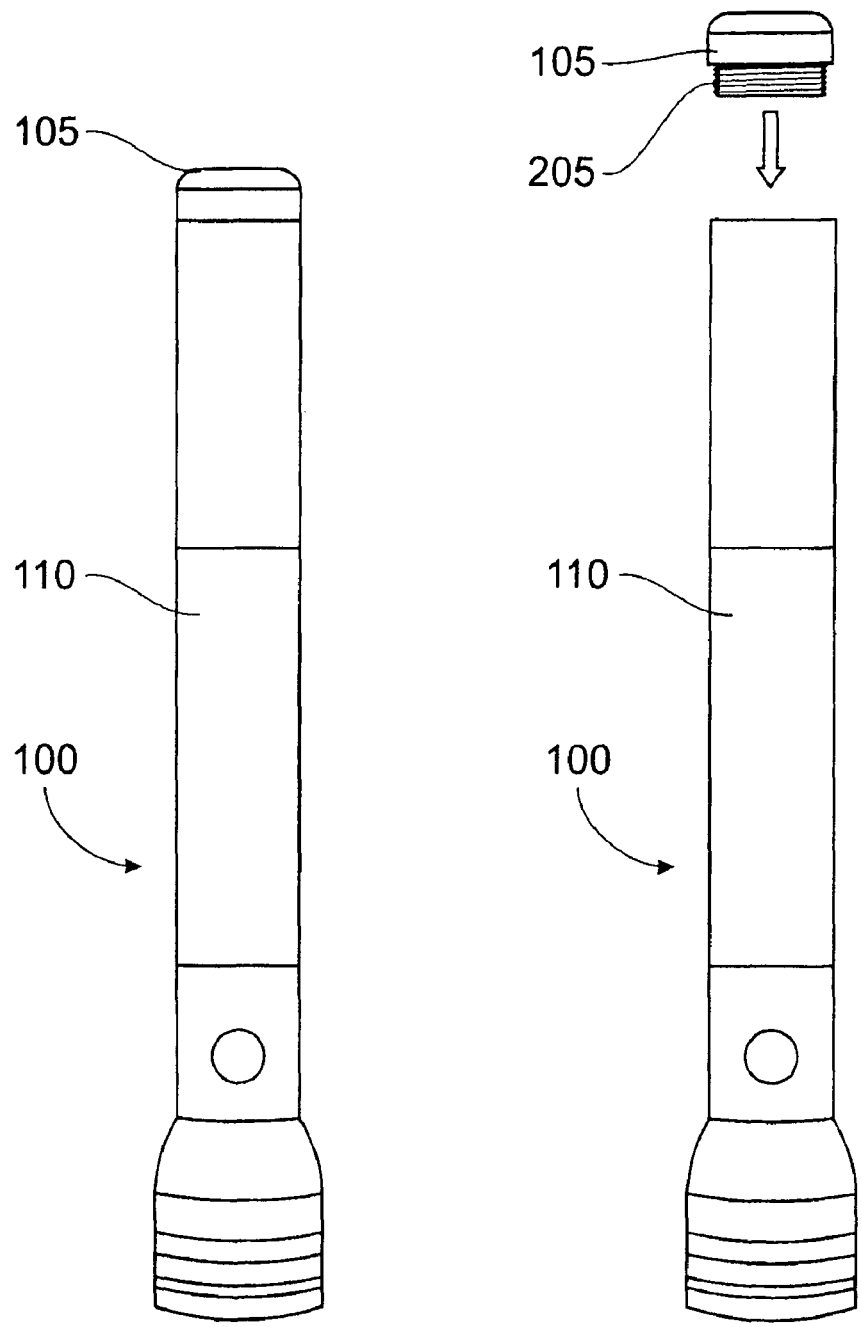
FIG. 1 is a side view of a non-rechargeable Maglite® brand flashlight, according to the prior art.
FIG. 2 is a top elevational view of a non-rechargeable Maglite® brand flashlight, showing the original tail cap removed, according to the prior art.

The same reference numerals refer to the same parts throughout the various figures. Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. The apparatus and method components have been represented to show only those specific details that are pertinent to understanding the embodiments of the present invention, so as not to obscure the disclosure with details that will be readily apparent to those of ordinary skill in the art having the benefit of the description herein.

DETAILED DESCRIPTION OF THE INVENTION

Referring now to the drawings, and particularly to FIGS. 1-23, an embodiment of the recharging base station of the present invention is shown and generally designated by the reference numeral 10.

According to some embodiments of the present invention, a method enables converting a non-rechargeable flashlight to a rechargeable flashlight. The method includes removing an original tail cap from the flashlight; placing a rechargeable battery into a housing of the flashlight; and replacing the original tail cap with a replacement tail cap, wherein the replacement tail cap comprises circuitry for receiving electrical power from a recharging base station for recharging the rechargeable battery. Embodiments of the present invention thus enable more efficient, economical, and environmentally friendly use of non-rechargeable flashlights such as non-rechargeable Maglite® brand flashlights.

In this patent specification, adjectives such as first and second, upper and lower, top and bottom, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

FIG. 1 is a side view of a non-rechargeable Maglite® brand flashlight 100, according to the prior art. As shown, the flashlight 100 includes an original tail cap 105 that can be unscrewed from a housing 110 of the flashlight 100.

FIG. 2 is a further side view of the non-rechargeable Maglite® brand flashlight 100, showing the original tail cap 105 removed, according to the prior art. External threads 205 on the original tail cap 105 are used to secure the tail cap 105 to the housing 110.

Figure 3:
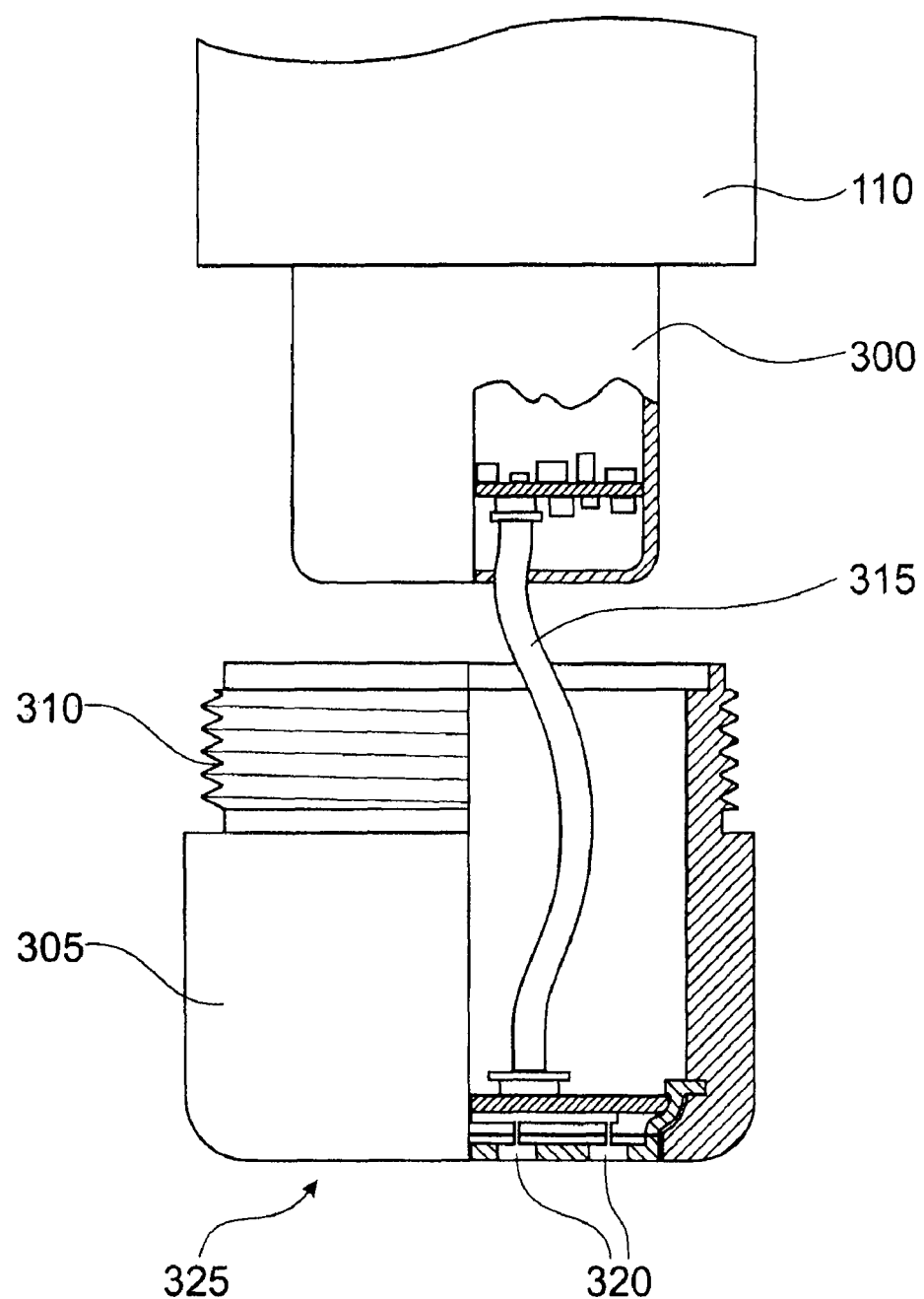
FIG. 3 is a close up partial cutaway side view of a rechargeable battery located in a non-rechargeable Maglite® brand flashlight housing and connected to a replacement tail cap, according to an embodiment of the present invention.

FIG. 3 is a close up partial cutaway side view of a rechargeable battery 300 located in the housing 110 of the non-rechargeable Maglite® brand flashlight 100 and connected to a replacement tail cap 305, according to an embodiment of the present invention. As shown, the external shape and configuration of the replacement tail cap 305 is approximately the same as the external shape and configuration of the original tail cap 105. External threads 310 have a pitch, diameter and size that match the pitch, diameter and size of the external threads 205 of the original tail cap 105. After the original tail cap 105 is removed, the external threads 310 enable the replacement tail cap 305 to be easily threaded into the corresponding internal threads (not shown) of the housing 110. A spring (not shown) may be installed between the battery 300 and the tail cap 305 to securely hold the battery 300 in place when the tail cap 305 is threaded onto the housing 110. As will be understood by those having ordinary skill in the art, the replacement tail cap 305 can be manufactured of various materials such as aluminum, steel, metal alloys, composites, or polymer materials. The battery 300, can be but not limited to, a rechargeable intelligent battery module that include a programmable module containing long cycle life lithium ion LiFePO4 batteries.

A wire 315 provides an electrical connection between the rechargeable battery 300 and external electrical contacts 320 on an end 325 of the replacement tail cap 305. As described in further detail below, when the flashlight 100, with the replacement tail cap 305 installed, is placed in a recharging base station the external electrical contacts 320 touch corresponding external contacts on the base station. That enables power from the base station to be delivered to the rechargeable battery 300 to recharge the battery 300.

Figure 4:
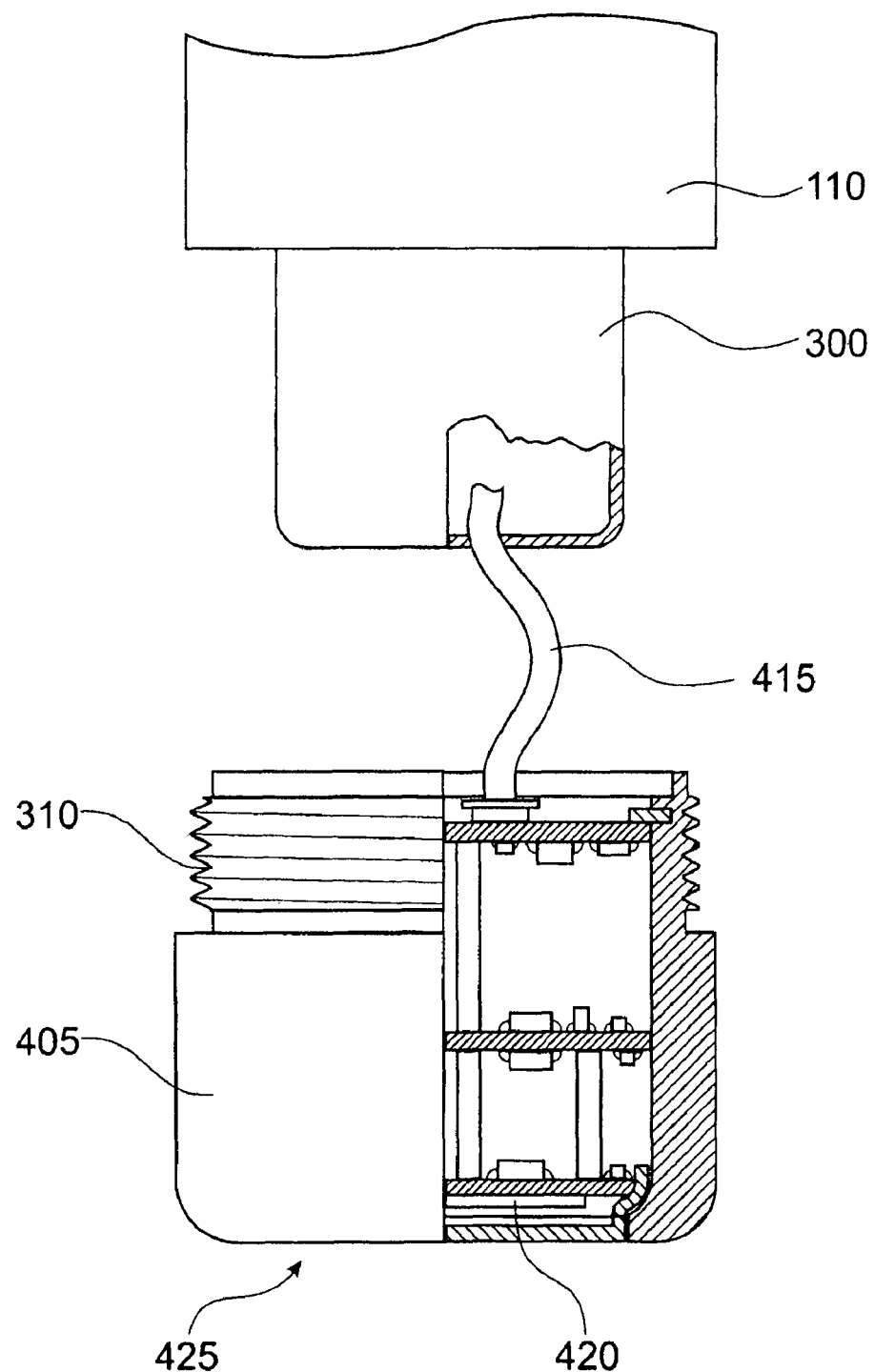
FIG. 4 is a close up partial cutaway side view of a rechargeable battery located in a non-rechargeable Maglite® brand flashlight housing and connected to a replacement tail cap, according to an alternative embodiment of the present invention.

FIG. 4 is a close up partial cutaway side view of a rechargeable battery 300 located in the housing 110 of the non-rechargeable Maglite® brand flashlight 100 and connected to a replacement tail cap 405, according to an alternative embodiment of the present invention. A wire 415 provides an electrical connection between the rechargeable battery 300 and an internal secondary coil 420 located near an end 425 of the replacement tail cap 405.

As described in further detail below, when the flashlight 100, with the replacement tail cap 405 installed, is placed in a recharging base station the internal secondary coil 420 is adjacent a corresponding primary coil of the base station. That enables power from the base station to be inductively delivered to the rechargeable battery 300 to recharge the battery 300.

Also, according to alternative embodiments the battery 300 can be shaped as a dummy housing to simulate the end to end size of 2, 3, 4 or more D-cell batteries, according to the length of the flashlight housing 110. By incorporating an integrated voltage converter into the battery 300, the latest in battery technology always can be employed without the need to entirely replace the non-rechargeable Maglite® brand flashlight 100. For example, long cycle life lithium ion LiFePO4 batteries, which can be recharged thousands of times, can require voltage conversion to conform to the voltage requirements of a particular flashlight bulb. However, use of such batteries can be very desirable as they can significantly reduce the overall weight of a retrofitted flashlight.

Figure 5:
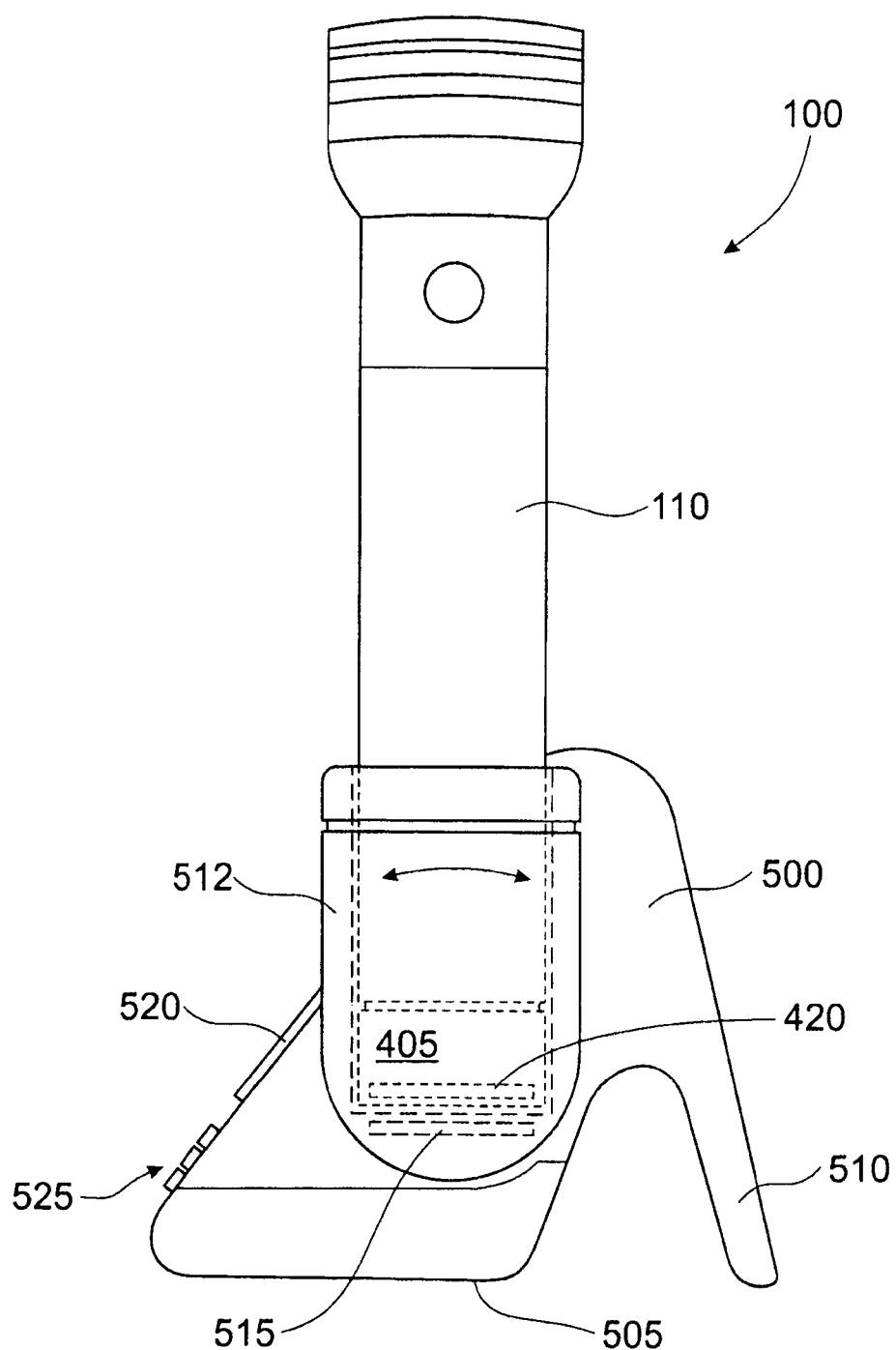
FIG. 5 is a side view of a non-rechargeable Maglite® brand flashlight fitted with a rechargeable battery and a replacement tail cap, and positioned in a recharging base station, according to an embodiment of the present invention.

FIG. 5 is a side view of the non-rechargeable Maglite® brand flashlight 100 fitted with the rechargeable battery 300 and the replacement tail cap 405, and positioned in a recharging base station 500, according to an embodiment of the present invention. The base station 500 is designed with a flat bottom 505 and a support leg 510 that can rest on top of a flat surface such as a table or floor. A cylindrical receptacle 512 receives the tail cap 405 and a lower end of the housing 110 of the flashlight 100. The receptacle 512 thus supports the flashlight 100 in a vertical orientation and ensures that the secondary coil 420 is held adjacent to a primary coil 515 located in the base station 500. Other features of the base station 500 may include, for example, a display screen 520 and operating buttons 525. The base station 500 is thus similar to the well-known and commercially available base stations used for inductively charging various electrical and electronic devices such as toothbrushes and mobile telephones.

Advantageously, when installed in the base station 500, the flashlight 100 remains readily usable, even during a charging phase, as the flashlight 100 can be used quickly by simply lifting the flashlight 100 out of the base station 500 and turning the flashlight on.

As will be understood by those having ordinary skill in the art, a similar base station can be configured with contacts points that replace the primary coil 515 of the base station 500, and enable the similar base station to charge the battery 300 using external electrical contacts 320 of the tail cap 305. Alternatively, the base station 500 and replacement tail cap 405 also can be modified to various designs to enable effective inductive charging. For example, the secondary coil 420 and tail cap 405 can be modified so that a secondary coil surrounds the sides of a hole in the end 425. The primary coil 515 and base station 500 are then modified so that a primary coil extends into a protrusion from the base station. During charging, the protrusion extends into the hole to facilitate an effective inductive electrical coupling.

Other features of the base station 500 are not illustrated or described herein as they will be readily understood in light of the present description by those having ordinary skill in the art. For example, such features include alternating current (AC) power sources that plug into a conventional 110V or 240V power outlet, power regulating devices, and charging circuitry.

The concepts of the present invention may be readily utilized for flashlights using numerous battery sizes including "D", "C", "AA" and "AAA". It is also contemplated that a base station of the present invention can be used both in a free standing table configuration and in a wall mounted configuration. For this purpose a cylindrical receptacle which receives the flashlight 100, such as the receptacle 512, can be adjustable to rotate on an axis up and downward so that the flashlight 100 always remains in a vertical position.

Figure 6:
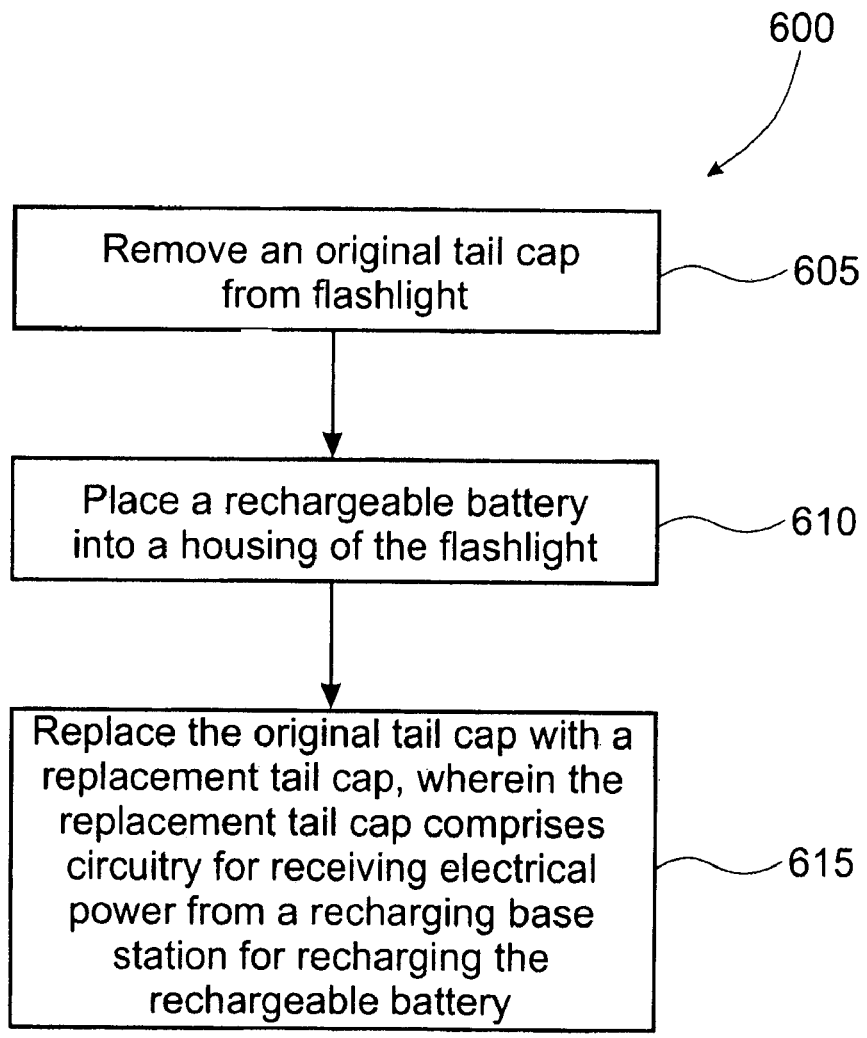
FIG. 6 is a flow diagram illustrating a method for converting a non-rechargeable flashlight to a rechargeable flashlight, according to an embodiment of the present invention.

FIG. 6 is a flow diagram illustrating a method 600 for converting a non-rechargeable flashlight to a rechargeable flashlight, according to an embodiment of the present invention. At step 605, an original tail cap is removed from the flashlight. For example, the original tail cap 105 is unscrewed from the non-rechargeable Maglite® brand flashlight 100.

At step 610, a rechargeable battery is placed into a housing of the flashlight. For example the rechargeable battery 300 is placed into the housing 110 of the flashlight 100.

At step 615, the original tail cap is replaced with a replacement tail cap, wherein the replacement tail cap comprises circuitry for receiving electrical power from a recharging base station for recharging the rechargeable battery. For example, the original tail cap 105 is replaced with one of the replaceable tail caps 305 or 405 and threaded onto the housing 110 of the flashlight 100.

Replacement tail caps such as the tail caps 305, 405, and base stations such as the base station 500, can be sold separately from flashlights such as the non-rechargeable Maglite® brand flashlight 100. That enables owners of non-rechargeable flashlights to easily and economically retrofit and convert a non-rechargeable flashlight to a more environmentally friendly rechargeable flashlight.

Figure 7:
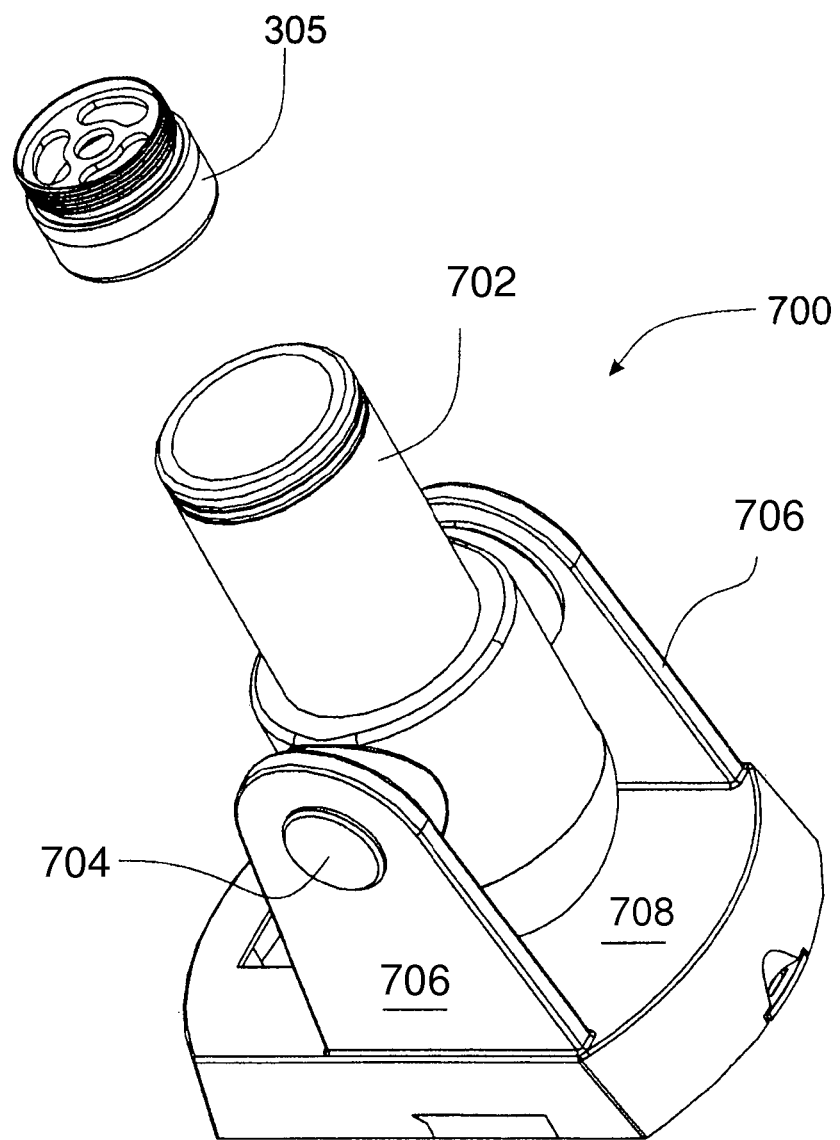
FIG. 7 is a perspective view of a recharging base station, according to an alternative embodiment of the present invention.

FIG. 7 is a perspective view of a recharging base station 700 according to an alternative embodiment of the present invention. A cylindrical receptacle 702 receives a tail cap; such as the tail cap 305 or 405, when threaded onto the housing 110 of the flashlight 100. Similar to the recharging base station 500, the base station 700 enables the flashlight 100 to remain readily usable, even during a charging phase, as the flashlight 100 can be used quickly by simply lifting the flashlight 100 out of the base station 700 and turning the flashlight on.

Figure 8:
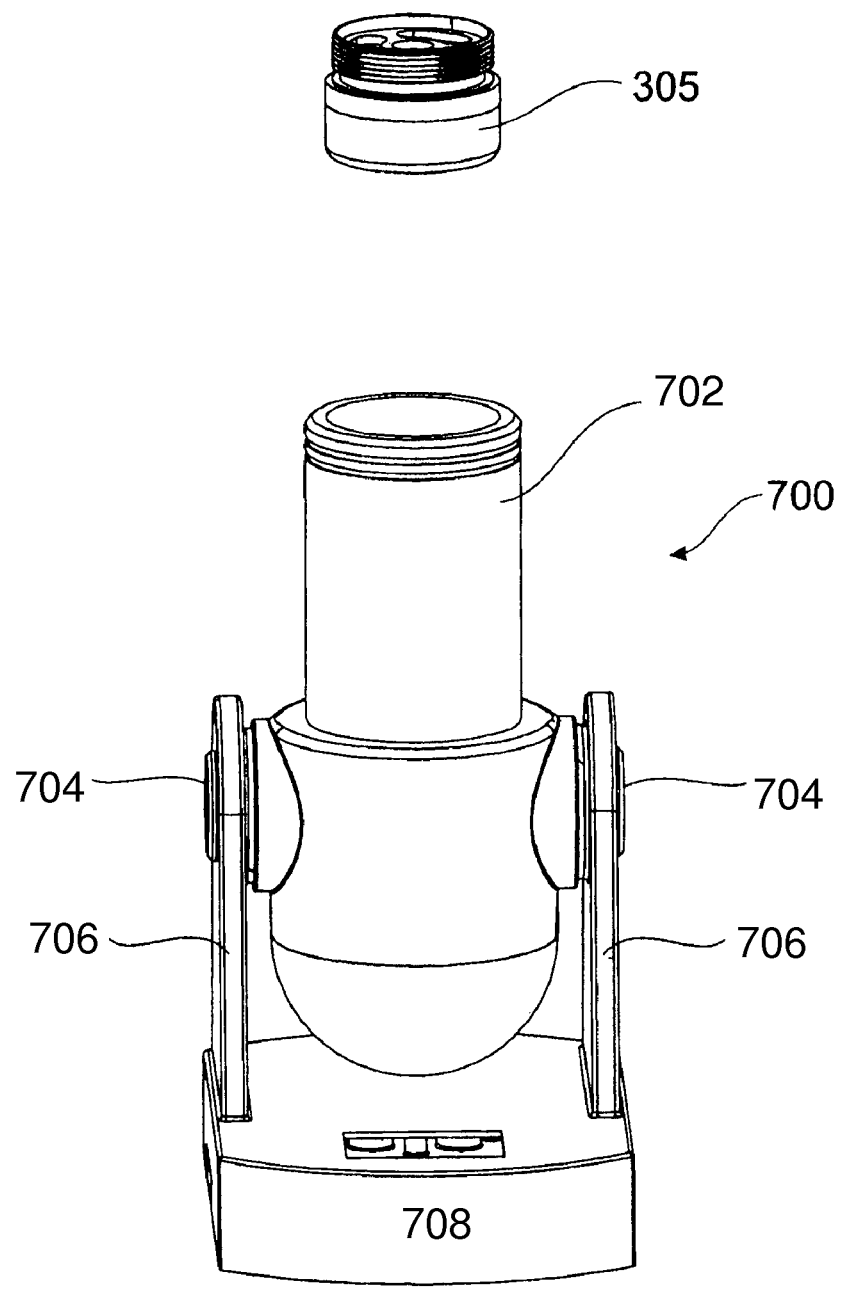
FIG. 8 is a side view of the recharging base station shown in FIG. 7.

FIG. 8 is a side view of the recharging base station 700. Hinge points 704 enable the cylindrical receptacle 702 to swivel about an axis extending between the hinge points 704, thereby enabling a flashlight 100 that is resting in the cylindrical receptacle 702 and being recharged to be positioned at an angle that is convenient to a user. Support arms 706 support the cylindrical receptacle 702 above a base 708. The base 708 then can be mounted either horizontally, such as on a table or floor, or vertically, such as on a wall.

Figure 9:
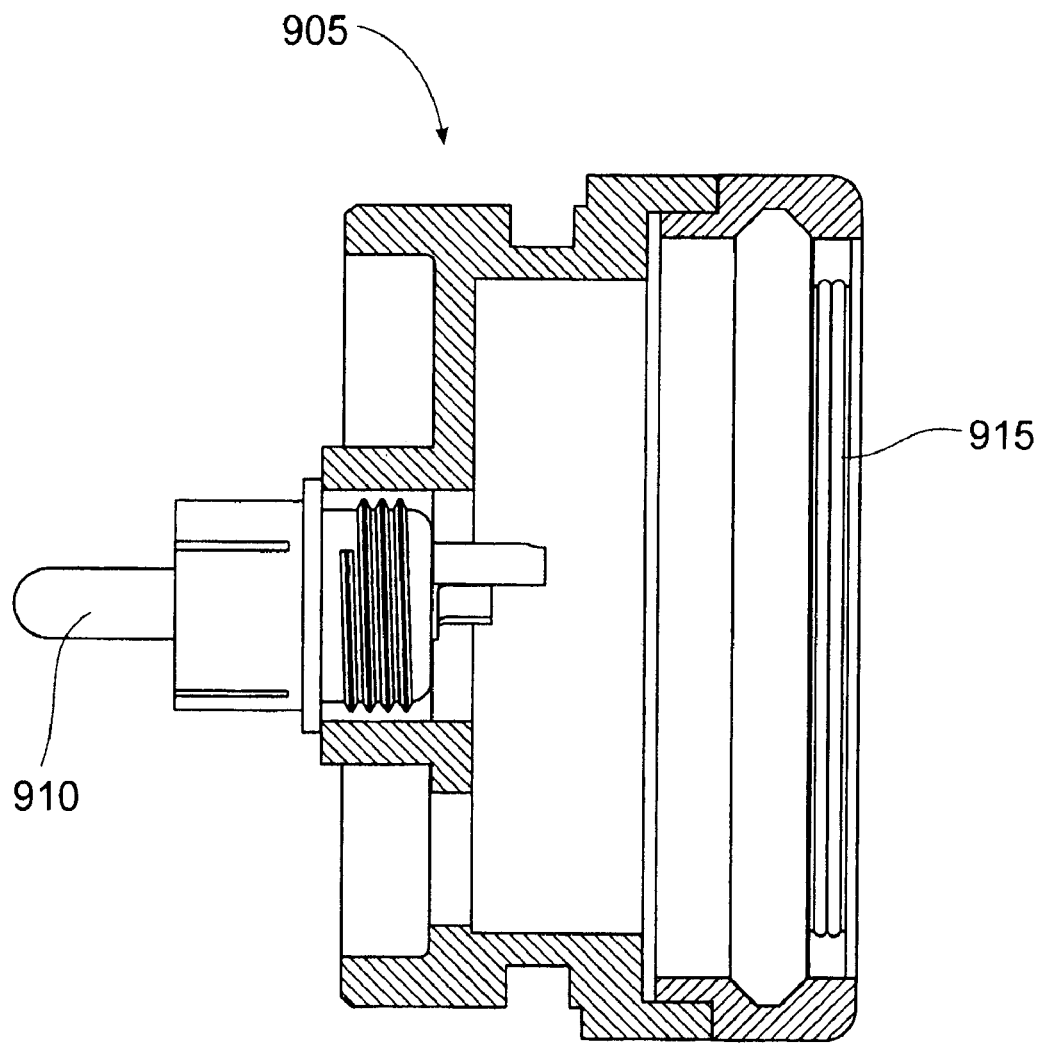
FIG. 9 is a side view of a tail cap, according to an alternative embodiment of the present invention.

FIG. 9 is a side view of a tail cap 905, according to an alternative embodiment of the present invention. As will be understood by those having ordinary skill in the art, many alternative embodiments of the tail caps 305, 405 are also encompassed by the teachings of the present invention. For example, the tail cap 905 includes a plug or jack-type coupling 910, such as a phono plug, between the tail cap 905 and a battery, rather than using the wires 315, 415. A negative connection to a flashlight housing then can include a conventional spring mounted at an end of the housing. The tail cap 905 also includes circuitry such as contacts 915 for electrically connecting, during recharging, the tail cap 905 to a base station, such as the recharging base station 700.

Figure 10:
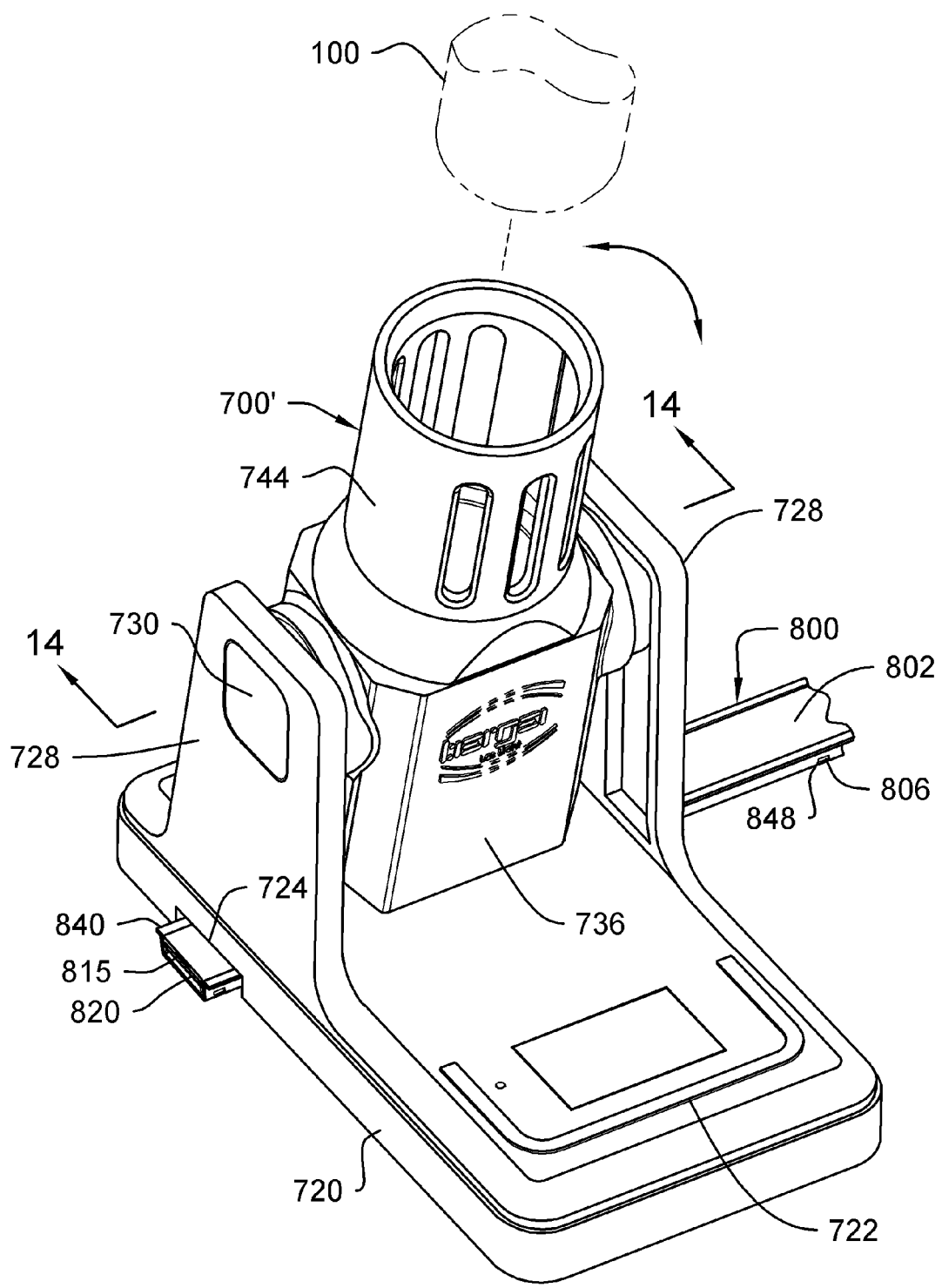
FIG. 10 is a top perspective view of the recharging base station and DIN rail assembly, according to an alternative embodiment of the recharging base station shown in FIG. 7.

FIG. 10 is a top perspective view of a recharging base station 700' in combination with a DIN rail assembly 800 according to an alternative embodiment of the present invention. A receiving unit 736 includes a cylindrical receptacle 744 configured to receive, but not limited to, a rechargeable battery or a housing of the flashlight 100. Similar to the recharging base station 700, the base station 700' enables the flashlight 100 to remain readily usable, even during a charging phase, as the flashlight 100 can be used quickly by simply lifting the flashlight 100 out of the base station 700' and turning the flashlight on.

The base station 700' includes a base 720 featuring a DIN rail receiving channel 724, a pair of side walls 728 extending away from an upper surface of the base 720. The side walls 728 are at a spaced apart relationship so as to great an area therebetween. The base station 700' is removably attachable to the DIN rail assembly 800, and multiple base stations 700' can be attached to a single DIN rail assembly 800.

Figure 11:
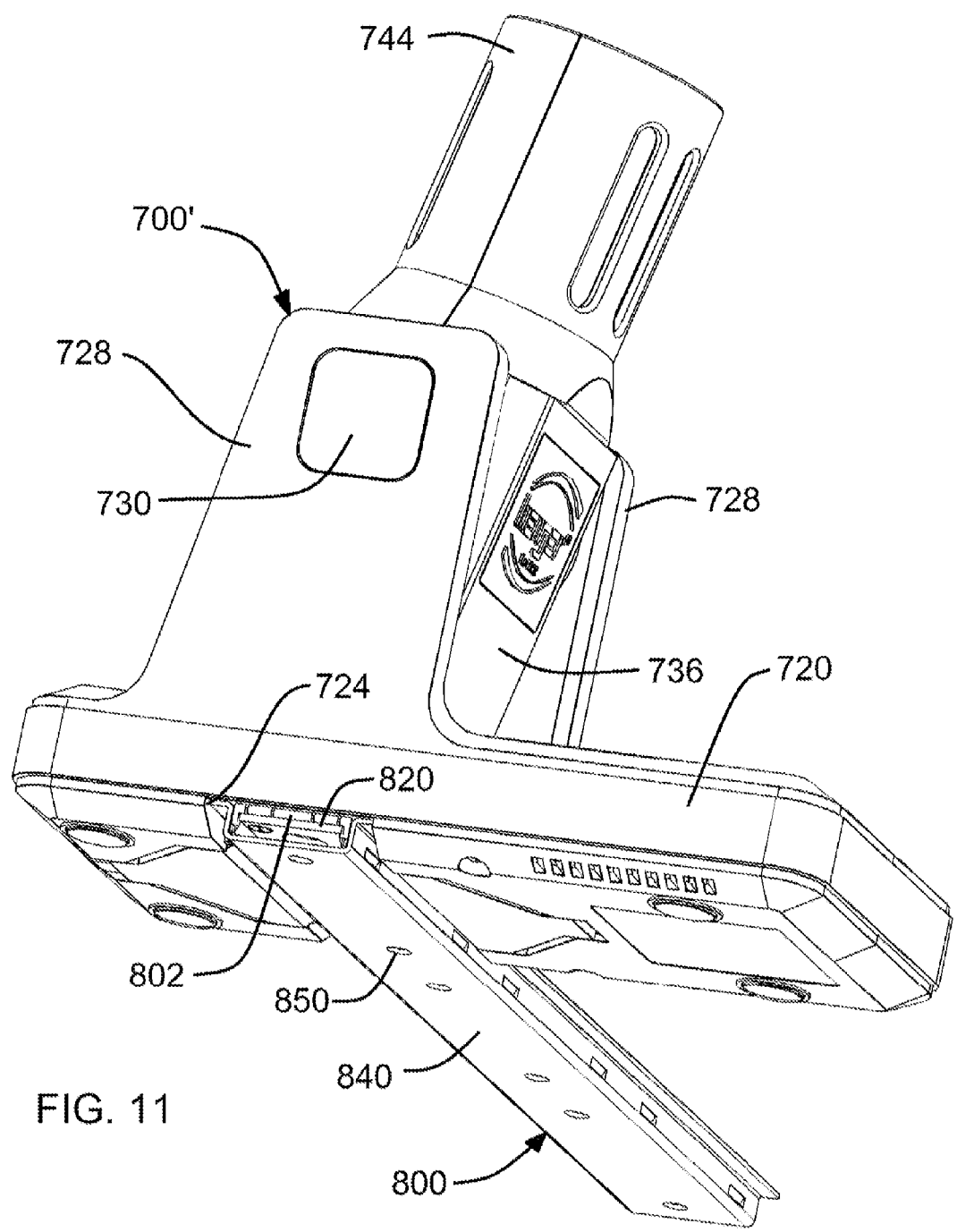
FIG. 11 is a bottom perspective view of the recharging base station and DIN rail assembly, according to the alternative embodiment shown in FIG. 10.

FIG. 11 is a bottom perspective view of the recharging base station 700' in combination with the DIN rail assembly 800. The channel 724 is configured to receive the DIN rail assembly 800 therein, and retain the DIN rail assembly in position so that the DIN rail assembly does not protrude past the bottom of the base 720 or feet attached to the bottom of the base. Thus allowing the DIN rail assembly 800 to be attached to a surface or wall while the base 720 of the recharging base station 700' is in contact with the surface or wall.

Figure 12:
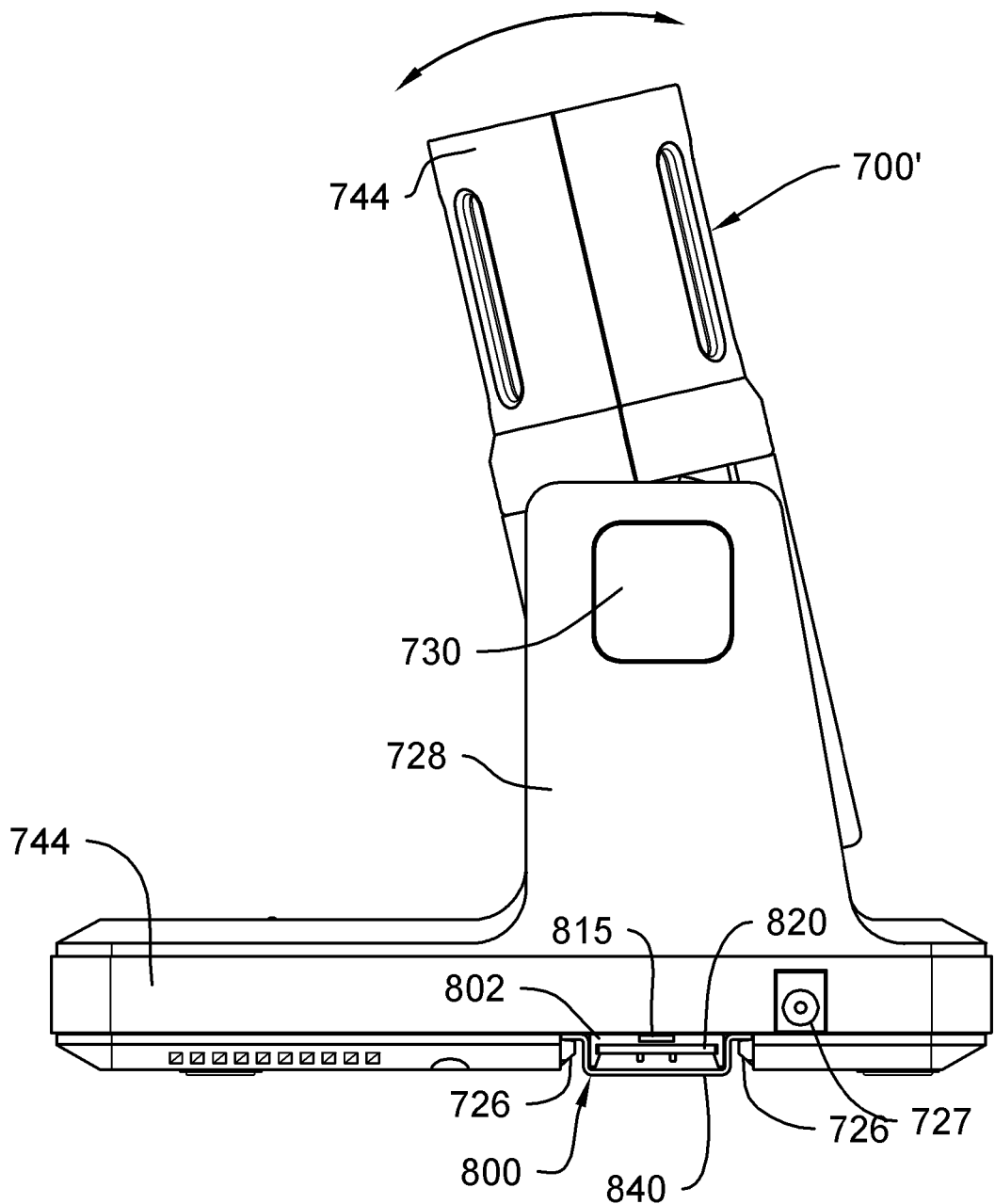
FIG. 12 is a side view of the recharging base station and DIN rail assembly, according to the alternative embodiment shown in FIG. 10.
Figure 16:
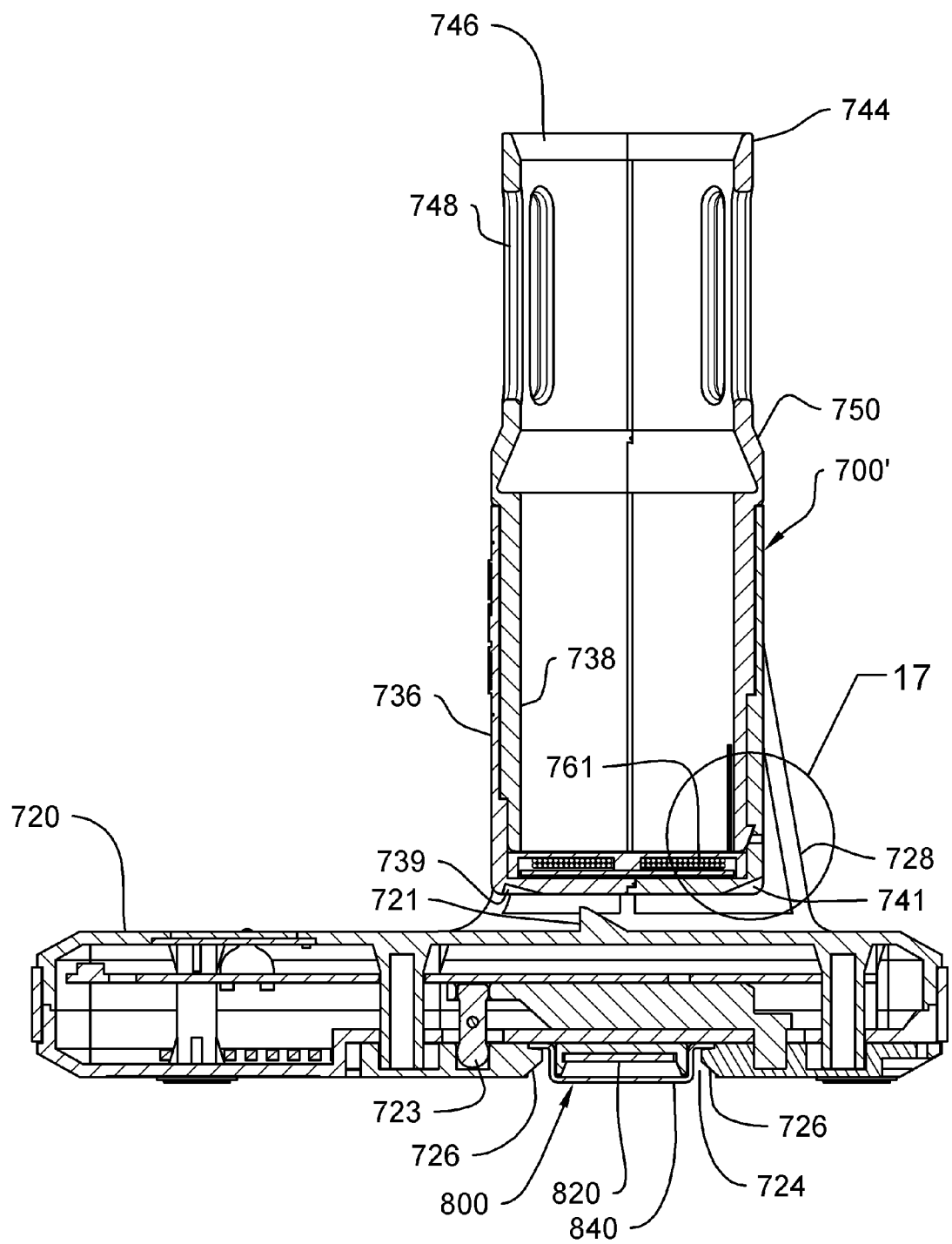
FIG. 16 is a cross-sectional view of the recharging base station connected to the DIN rail assembly taken along line 16-16 in FIG. 14.

FIG. 12 is a side view of the recharging base station 700' in combination with the DIN rail assembly 800. The channel 724 is configured to receive the DIN rail assembly 800 therein by way of a pair of latches 726, as best illustrated in FIGS. 12 and 16. Lips of the DIN rail assembly 800 push at least one of the latches 726 into a recessed position when the base station 700' is fitted on the DIN rail assembly. The base station 700' can be removed from the DIN rail assembly 800 by pressing the latches 726, and then separate the base station from the DIN rail assembly. At least one of the latches 726 is biased by a spring or lever 723 to return to its previous position to retain the lips of the DIN rail assembly 800.

The base station 700' can be powered by plugging in a power supply directly in to the base 720 via a plug or port 727, which passes the power via contacts on the bottom on to the DIN rail assembly 800.

Figure 13:
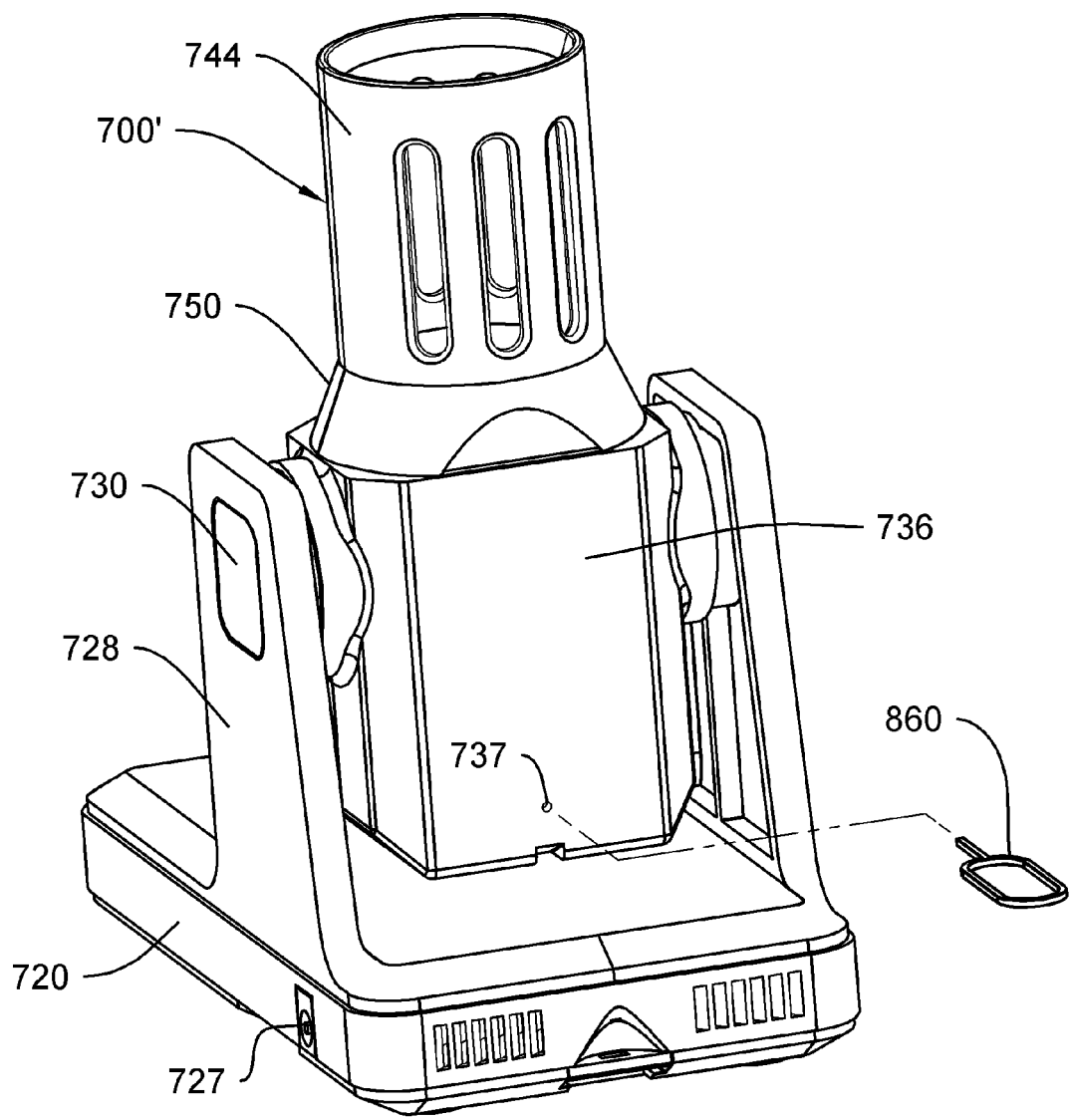
FIG. 13 is a rear perspective view of the recharging base station, according to the alternate embodiment shown in FIG. 10.

FIG. 13 is rear perspective view the base station 700'. The receiving unit 736 features a hole or bore 737 that is configured to receive a key 860, which is used to unlock the cylindrical receptacle 744 from the receiving unit 736. This allows for different sized cylindrical receptacles 744 to be used with a single base station 700'.

Figure 14:
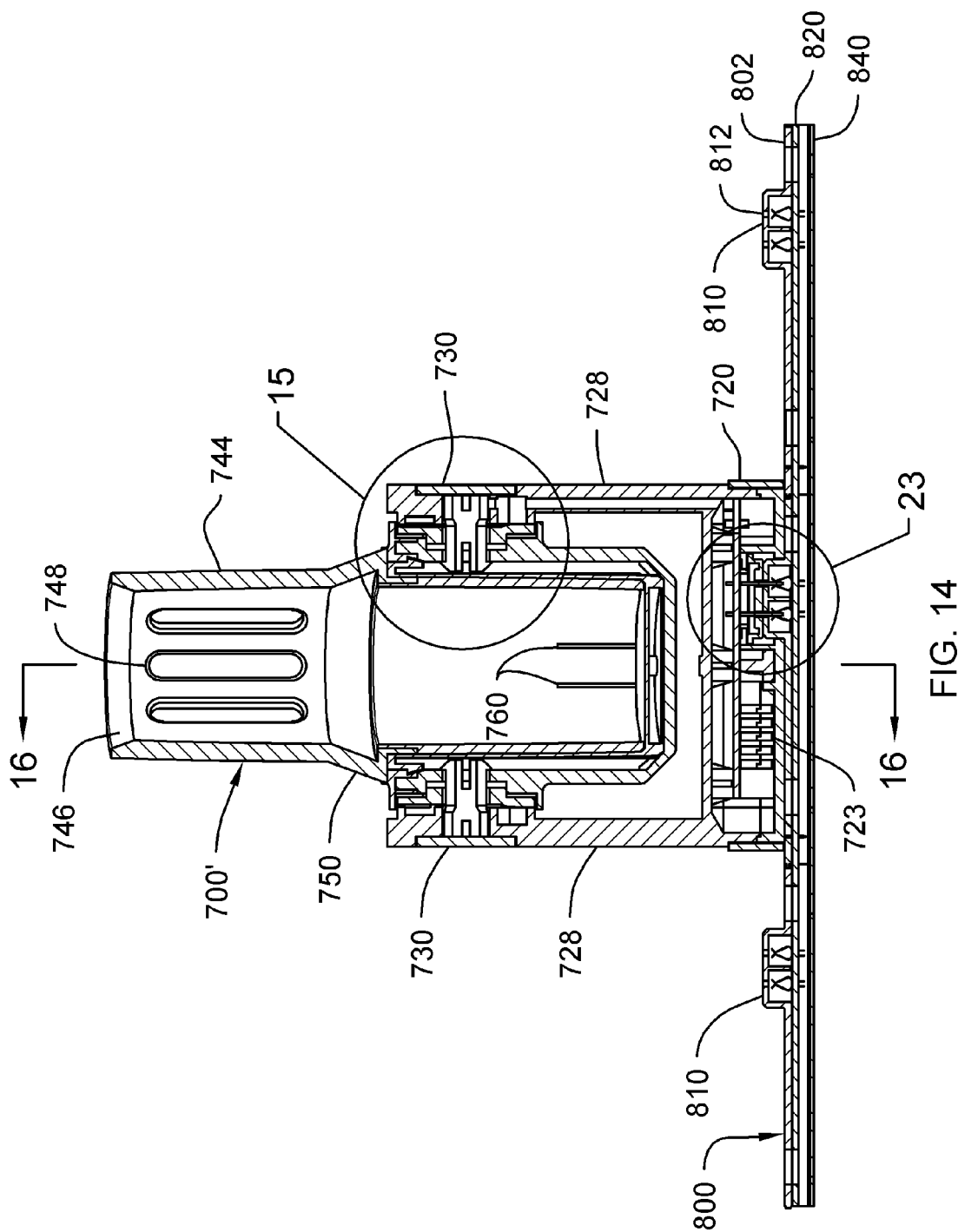
FIG. 14 is a cross-sectional view of the recharging base station connected to the DIN rail assembly taken along line 14-14 in FIG. 10.

FIG. 14 is a cross-section view of the base station 700' connected to the DIN rail assembly 800. The receiving unit 736 is pivotably connected to the side walls 728 by way of a pair of pivot connectors 730, thereby allowing the receiving unit 736 to rotate about a longitudinal axis of the pivot connectors 730 and between the side walls 728. It can be appreciated that a single side wall 728 and pivot connector 730 can be used instead of the illustrated pair, thereby supporting the receiving unit 736 as a cantilever.

The receiving unit 736 and the cylindrical receptacle 744 have a hollow interior configured to receive the battery or flashlight 100. The cylindrical receptacle 744 further includes a tapered interior upper edge 746 and a plurality of openings 748 defined through the cylindrical receptacle. The tapered interior edge 746 guides the insertion of the battery or flashlight 100 into the hollow interior of the cylindrical receptacle 744. The cylindrical receptacle 744 can include a flared tapered end portion 750 for supporting the cylindrical receptacle 744 on or against the receiving unit 736.

Figure 15:
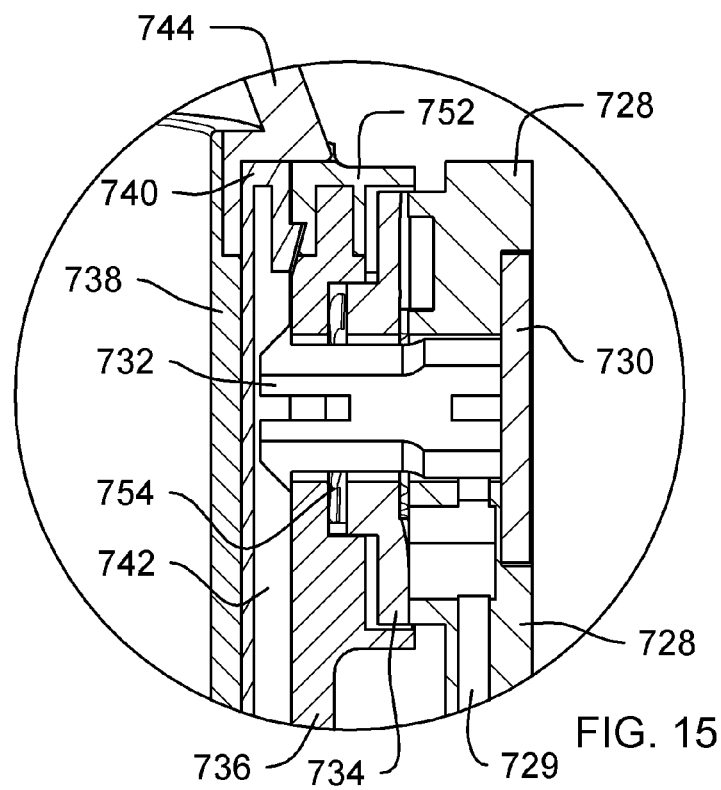
FIG. 15 is an enlarged cross-sectional view of the pivot connection of the recharging base station shown in FIG. 14.

The receiving unit 736 includes a closed bottom with electrical contacts or prongs 760 extending into the hollow interior for contacting electrical contact elements of the battery or flashlight 100 when received in the receiving unit 736. Wiring can be used to connect the prongs 760 to a power supply, and may run through a channel 742 defined in the receiving unit 736, an opening defined in at least one of the pivot connectors 730, and a channel 729 defined in at least one of the side walls 728, as best illustrated in FIG. 15.

Figure 17:
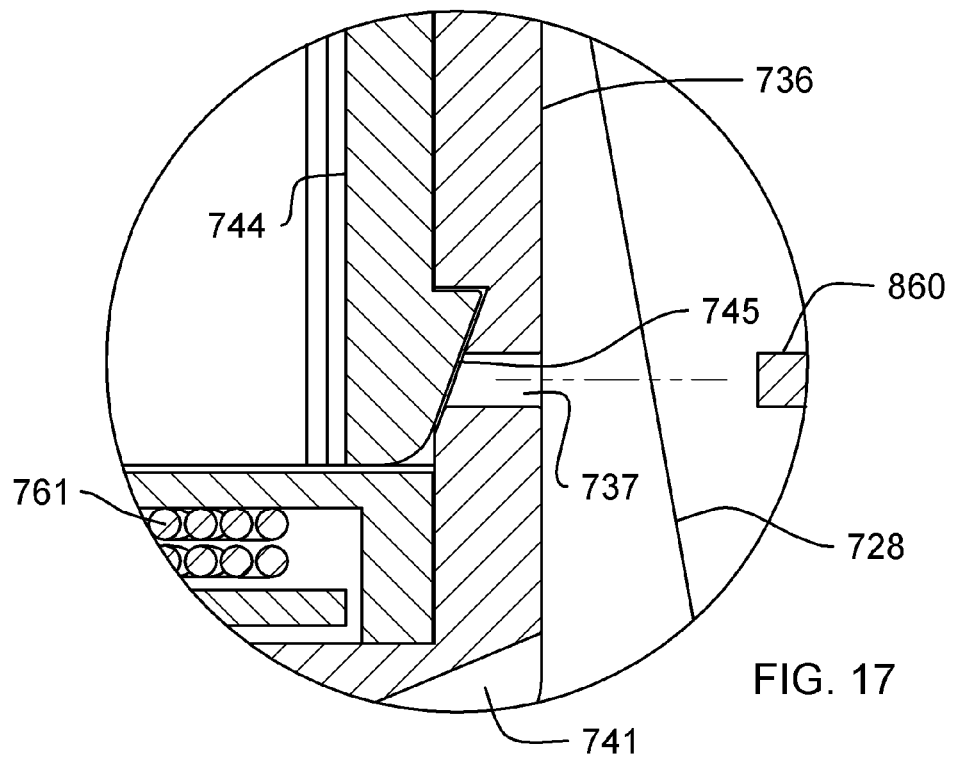
FIG. 17 is an enlarged cross-section view of the inner shell retaining assembly of the recharging base station shown in FIG. 16

It can be appreciated that an electrical connection between a main charging printed circuit board inside the base 720 to a secondary coil 761, as best illustrated in FIGS. 16 and 17, in the cylindrical receptacle 744 can be a wire running through the channel 742 and through the pivoting connector 730 and spacer 734 to the coil 761. It should be noted that the pivot connectors 730 do not rotate as to not damage the wire running therethrough.

The base station 700' can include a Lithium Iron Phosphate (LiFePO4) battery 723 as a power source for an emergency light function. It can be appreciated that any portable power source, battery or capacitor can be used in place of the LiFePO4 battery. The battery 723 can be located in the base 720 or in one or both of the side walls 728.

In case of emergency like main power cut off it is imperative to know where a flashlight is and how to find the flashlight. Most of the people do not know where their flashlight is or where to look for it. This disadvantage is solved with an emergency light function of the base station 700' which would light up in case a main power failure.

This emergency light function will not only show the position of the flashlight 100, the base station 700' can also be a source of light by including a bank of LED's 722 that will light up. The LED's 722 will be powered by the built-in LifePo4 battery 723 so to assure there are two light sources available, the flashlight 100 which is mobile and the LED bank 722 in the base 720 providing light to the general area near the base station 700'.

The base station 700' can be connected to any power source, such as but not limited to, 8 volt DC to 48 volt DC, AC and a compact solar module small in size as the power draw is within the 10 watt usage to charge the flashlight 100 and internal battery 723 in case a 20 hour of light provided from the emergency light is not enough. Thereby making the base station 700' independent from the main power grid.

FIG. 15 is an enlarged cross-section view of one of the pivot connectors 730 pivotably connecting the base station 700' to one of the side walls 728. The pivot connector 730 has a plurality of latching fingers 732 extending therefrom. The fingers 732 are biased and configured to flex so as to be inserted through a bore defined in the side wall 728, a bored defined in a spacer 734, and a bore defined through one side of the receiving unit 736. The ends of the fingers 732 are configured to latch onto a surface of the receiving unit 736 defining the bore, thereby pivotably connecting the receiving unit 736 with the spacer 734 and with the side wall 728.

The receiving unit 736 further includes a transition ring 752, an intermediate shell 740 and an inner shell 738. The intermediate shell 740 and the inner shell 738 are interior of the receiving unit 736 so as to form a gap between the inner shell 738 and the receiving unit 736. The gap is configured to receive therein the latching end of the fingers 732.

The transition ring 752 is coupled to an edge of the receiving unit 736 and the intermediate shell 740, and is configured to provide an exterior section that covers the edge of the receiving unit 736 and an edge of the spacer 734. The transition ring 752 has a curved exterior profile so as to provide a smooth transition surface from the cylindrical receptacle 744 to the side wall 728.

A spring 754 is located around the fingers 732 and between the receiving unit 736 and the spacer 734, as best illustrated in FIG. 15. The spring 754 forces the receiving unit 736 toward the latching ends of the fingers 732, thereby removing any play between the receiving unit 736, the spacer 734 and the side walls 728.

FIG. 16 is a side cross-sectional view of the base station 700' connected to the DIN rail assembly 800. The latches 726 located in the base 720 are biased by the lever 723 so as to return to a locked position so as to retain the lips of the lower DIN rail 840. The lever 723 pivots so as to move the latches 726 in opposite directions by a linkage housed within the base 720. Thus locking the DIN rail assembly 800 within the channel 724 of the base 720. In use, the DIN rail assembly 800 is received in the channel 724, and the lips of the lower DIN rail 840 contacts an inclined surface of at least one of the latches 726, thus pushing the latch laterally. Since the latches 726 are connected to each other by way of a linkage and the pivoting lever 723, then the latches move laterally in opposite directions, thereby fully receiving the DIN rail assembly 800 within the channel 724. When the lips of the lower DIN rail 840 move past the latches 726, the latches return to their closed positions, thereby locking the DIN rail assembly 800 in the channel 724.

The base 720 also includes a pivot stop 721 extending up toward a bottom surface of the receiving unit 736. The receiving unit 736 includes a recess 739 configured to receive the pivot stop 721 when the receiving unit is pivoted in a first direction, and a cutout 741 configured to allow the pivot stop 721 to pass through while the receiving unit 736 pivots in an opposite second direction. The pivot stop 721 and recess 739 limit the pivot travel of the receiving unit 736 in the first direction. The cutout 741 does not limit or prohibit the pivot travel of the receiving unit 736 in the second direction.

In an alternate embodiment, the inner and intermediate shells are combined with the cylindrical receptacle 744, thereby making a single cylindrical receptacle unit 744 that is received in the receiving unit 736, as best illustrated in FIG. 17. In an additional alternate embodiment, the prongs 760 of the receiving unit 736 can be replaced with charging coils 761, which provide contactless charging of the battery or flashlight 100.

FIG. 17 is an enlarged cross-sectional view of the cylindrical receptacle 744 and receiving unit 736 locking assembly. The cylindrical receptacle 744 can be removable from the receiving unit 736. The cylindrical receptacle 744 can be locked within the receiving unit 736 by a latch 745 which is received and retained in a recess, notch or groove defined in an interior side of the receiving unit 736. Thereby allowing the cylindrical receptacle 744 to be replaced with different inner diameter receiving units for flashlights in other sizes than the MagLite® or the C-cell sized MagLite®. This ensures a low cost solution to widen the application range of the recharging base station 700'. A hole or bore 737 defined through the receiving unit 736, which is communication with the latch 745 receiving recess, allows a key 860 to be inserted through the bore 737 and dislodge the latch 745 from its receiving recess. Thereby allowing the cylindrical receptacle 744 to be removed from the receiving unit 736.

The cylindrical receptacle 744 contains no electrical or electronics component to ensure the interchange cost is minimal and customers who own a recharging base station 700' already could buy the new cylindrical receptacle 744 for their different sized flashlight without having to buy a new recharging base station 700'.

It can be appreciated that the key 860 is an example of a tool that can be used to dislodge the latch 745, and that a little pin, paperclip end or similar article may be used through the bore 737 and release the latch 745 of the cylindrical receptacle 744.

Figure 18:
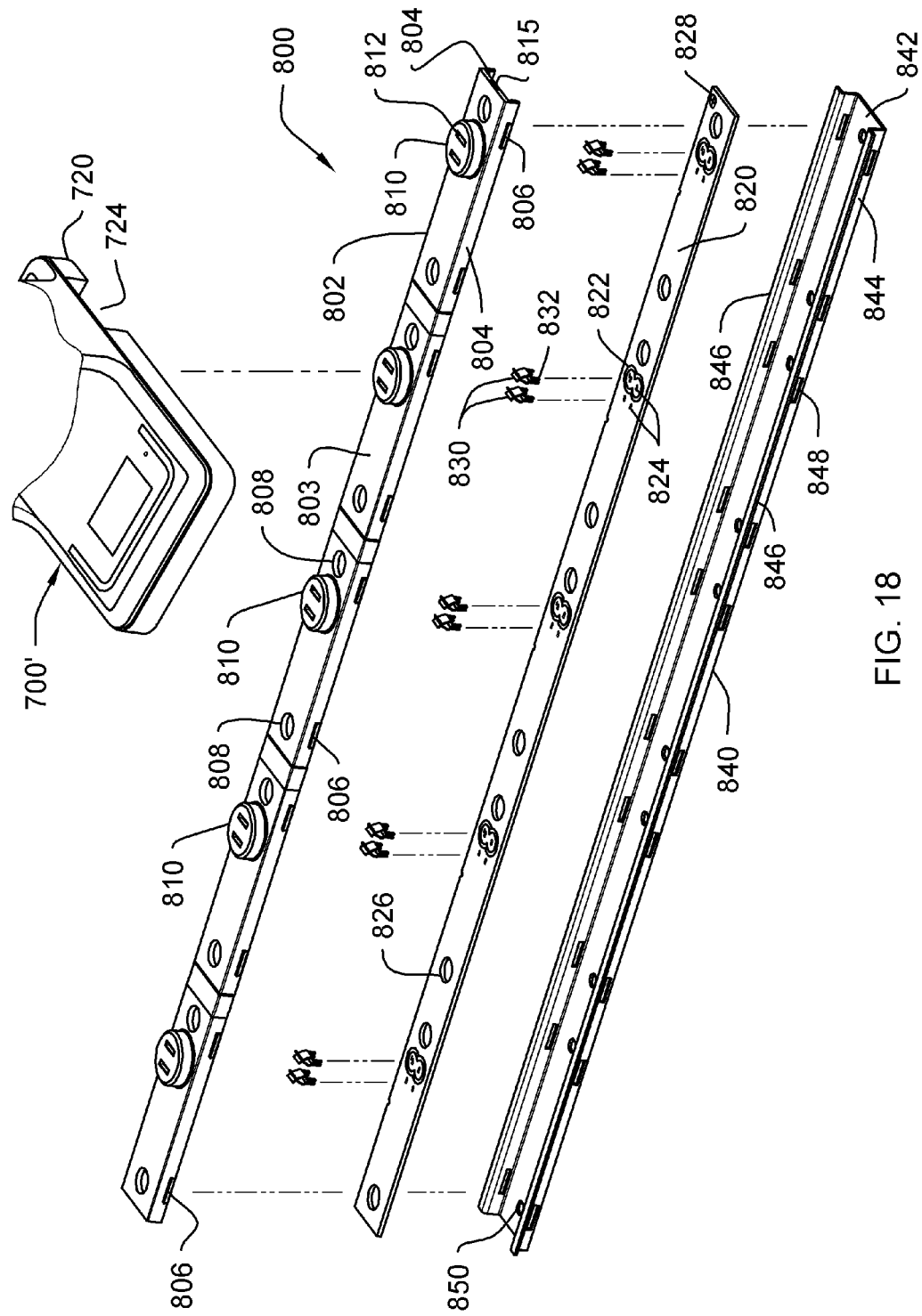
FIG. 18 is an exploded perspective view of the recharging base station and DIN rail assembly shown in FIG. 10.

FIG. 18 is an exploded perspective view of the DIN rail assembly 800 to provide electrical communication between the base station 700' and an optional main power supple or grid. The DIN rail assembly 800 includes a DIN rail cover strip 802 configured to connect with the base station 700', an inner strip 820 received in the DIN rail cover strip, and a lower DIN rail 840 configured to receive and retain the cover strip 802 therein. The DIN rail assembly 800 can be of any length, including a single cover strip or multiple cover strips connected to each other by connection ends, thereby allow for multiple base stations 700' to be connected to the DIN rail assembly 800.

The DIN rail cover strip 802, as best illustrated in FIG. 19, includes a top side 803, and a pair of side walls 804 extending away from the top side 803. The top side 803 features at least one bore 808 defined therethrough, and a male connection member 810 extending away from the top side 801 opposite the side walls 804. The side walls 804 each includes at least one tab 806 located near a distal end of the side wall. The tab 806 has a tapered configuration that angles outwardly from the distal end of the side wall 804, thereby producing a latch. The male connection member 810 features prong openings 812, and can have a circular shape or any shape that corresponds with or is received by a recess or opening defined in a bottom surface of the base 720 of the base station 700'.

Figure 20:
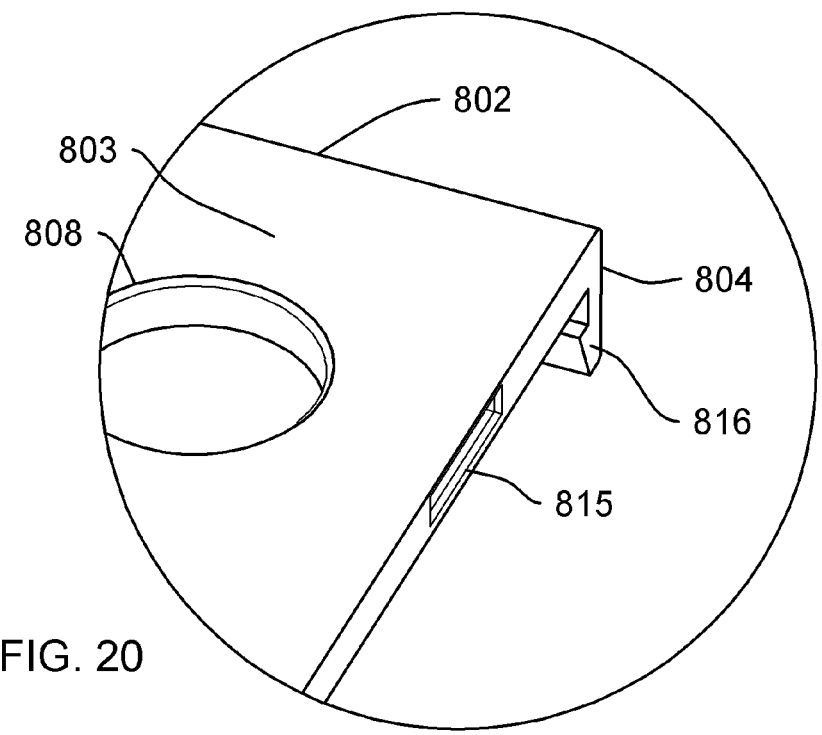
FIG. 20 is an enlarged perspective view of the end connection of the DIN rail cover strip of the DIN rail assembly shown in FIG. 19.

The distal ends 816 of each side wall 804 includes a tapered flanged portion, as best illustrated in FIG. 20, which creates a lip extending interiorly from the side walls 804 and thus a space between an interior surface of the top side 803 and the lip of the flanged end 816. The space is configured to receive the inner strip 820.

The cover strip 802 can include connection means allowing multiple cover strips 802 to be connected together. The connection means can be integrated to the ends of the cover strip 802 thereby connecting one cover strip to another. The connection means includes a detent 814 extending out from an end of the top side 803 and/or distal ends 816 of the side walls 804 of the cover strip 802. A recess 815 are defined in an opposite end of the cover strip 802 which correspond with and are configured to receive the detent 814 of an adjoining cover strip.

In the vicinity of one end of the cover strip 802 can include break off points or perforations 817. The perforations 817 allow for a last cover strip, when several cover strips are assembled, to be removed or clipped off. This allows for a clean and smooth cover strip end. The perforations 817 only cover a gap between the cover strips as the single lower DIN rail 840 is not as wide as the base station 700', thus reducing tooling cost.

The inner strip 820, as best illustrated in FIG. 21, includes at least one bore 826 defined therethrough, at least two pairs of power connection fittings 824, and a main power contact 828. A pair of power connection clips 830, each including a plurality of prongs 832, is connected to each set of power connection fittings 824. The inner strip 820 thus provides power to the power connection clips 830. The inner strip 820 is sized so as to be retained in the space between the lip of the flanged end 816 and the top side 803 of the cover strip 802.

The lower DIN rail 840, as best illustrated in FIG. 22, can be secured to any support structure, and includes a main web 842 featuring a plurality of bores 850 defined therethrough, a pair of flanges 844 extending away from the web 842 so as create a lower rail gap therebetween, and a lip 846 extending away from each flange 844. The lips 846 are retained by the latches 726 when the base station 700' is fitted to the DIN rail assembly 800. The flanges 844 each have at least one opening 848 configured to receive the tab 806 when the cover strip 802 is received between the flanges 844, thereby securing the cover strip 802 to the lower DIN rail 840.

When assembled, the cover strip bore 808, the inner strip bore 826, and the lower DIN rail bores 850 are aligned, and the power connection clips 830 are aligned with the prong openings 812 of the male connection member 810.

The DIN rail assembly 800 can be manufactured in any configuration and is not limited to a single, 3 fold or 5 fold configuration, and can be manufactured in any predetermined length. The DIN rail assembly 800 is used to fix the base station 700' to any support structure, such as but not limited to a desk top or wall mounted through provided modular hole patterns.

Figure 23:
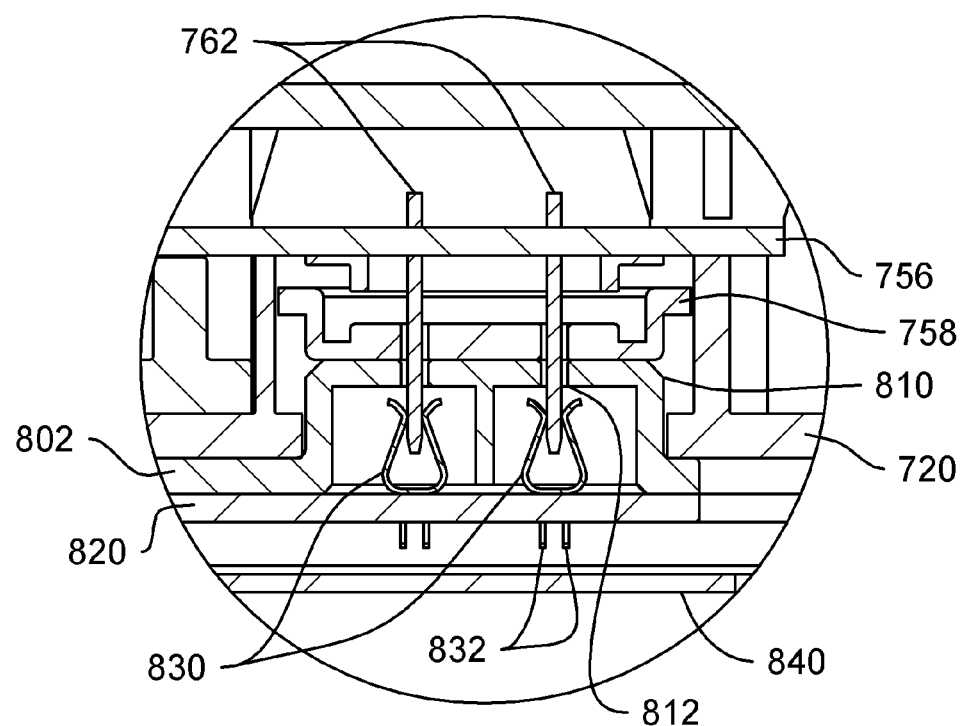
FIG. 23 is an enlarged cross-sectional view of the connection between the recharging base station and DIN rail assembly shown in FIG. 14.

FIG. 23 is an enlarged cross-sectional view of the power connection between the base station 700' and DIN rail assembly 800. The base 720 of the base station 700' includes a power strip 756, base prongs 762 connected to the power strip, and a prong cover plate 758. The base prongs 762 extend outwardly from the base 720, and the prong cover plate 758 is moveably received in the recess defined in the bottom surface of the base 720 which receives the male connection member 810.

When assembled, the base station 700' is attached to the DIN rail assembly 800 so that the male connection member 810 of the cover strip 802 contacts the prong cover plate 758, and moves the cover plate into the recess in the base 720 so as to expose the base prongs 762. Upon further assembly, the base prongs 762 are inserted through the prong openings 812 of the male connection member 810, and are received between the power connection clips 830 of the inner strip 820. Power is then transferred from the main power grid, through the inner strip 820, through the power connection fittings 824, through the power connection clips 830, through the base prongs 762, through the power strip 756, and then to the prongs 760 of the receiving unit 736.

It can be appreciated that the inner strip 820 can be eliminated, and the power connection clips 830 and main power contact 828 be associated with the lower DIN rail 840. Copper plating can be used on each side of the upper and lower rails in absence of wires to electrically connect the upper and lower rails so the need for costly wiring is obsolete. The cover strip side is +ve and lower rail bottom side is −ve.

Some of the advantages of the base station 700' and DIN rail assembly 800 are: to reduce power consumption during operation and idle state through reduced number of power supplies needed; to reduce space requirements for several flashlight chargers, increased convenience and handling time; provide possibility for desk top or wall mounting; and to reduce number of parts in the device to reduce cost and optimize assembly.

To reduce the power consumption of a set of 1 to 5 or more Flashlight chargers which are usually placed on a desk or bolted to the wall and require each one of them a separate power supply, the present base station 700' can be used in combination with the DIN rail assembly 800 which is based on the measurements of a standard DIN rail and consists of a special shaped inner strip, a printed circuit board (not shown) with its power contacts and the modular DIN rail cover strip.

To realize the "real power consumption minimization" the power supply connected to one of the DIN rail assembly 800 has an integrated "sleep mode" so if a single base station 700' or all base stations are fully charged and the demand for the power supply from the base stations is falling to an extreme low level of sequentially checking the battery module for its state of charge (SOC) only, the power supply will go in to sleep mode so as not to waste any energy.

Periodically initiated communication (sniffing) between power supply and the base station ensures the power is available when needed.

To reduce parts needed and therefore reduce assembly times and ultimately product cost, the use of a printed circuit board which holds the gold-plated DIN rail power contacts as the power distributor without any need for wiring.

The DIN rail assembly itself is considered a passive component. It will be powered up by clicking in one or several base stations whereby the power to operate the other base stations is passed on to the DIN rail and distributed to the other base stations. It is irrelevant on which position the base station is connected to or clicked in to the DIN rail assembly.

Other modules which can be connected to the DIN rail assembly could be, but not limited to, a wireless phone charger for different brands or battery charging apparatuses which only have to be clicked in and go.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A recharging base station system comprising:
   a DIN rail assembly having at least one power connection element, said power connection element being in electrical communication with a power supply; and
   at least one base station removably attachable to said DIN rail assembly, said base station being in electrical communication with said power connection element of said DIN rail assembly, said base station comprising:
   a base having at least one side wall extending away from said base;
   a receiving unit rotatably connected to said side wall of said base, said receiving unit being configured to receive a rechargeable element; and
   at least one receiving unit electrical contact configured to contact a portion of the rechargeable element when at least a portion of the rechargeable element is received in said receiving unit, said receiving unit electrical contact being in electrical communication with said power connection element of said DIN rail assembly.

2. The recharging base station system as claimed in claim 1, wherein said base of said base station further comprising at least one base electrical contact configured to be in contact with said power connection element of said DIN rail assembly when said base station is attached to said DIN rail assembly, said base electrical contact is in electrical communication with said receiving unit electrical contact.

3. The recharging base station system as claimed in claim 1, wherein said base station further comprising at least one battery in electrical communication with said receiving unit electrical contact.

4. The recharging base station system as claimed in claim 3, wherein said base further comprising at least one illumination element in electrical communication with said battery.

5. The recharging base station system as claimed in claim 1, wherein said base station further comprising a pivot connector having a portion received through said side wall of said base and into said receiving unit, said pivot connector is configured for rotatably coupling said receiving unit with said side wall of said base.

6. The recharging base station system as claimed in claim 5, wherein said pivot connector comprises of at least one flexible element having an end configured to retain a portion of said receiving unit.

7. The recharging base station system as claimed in claim 6, wherein said base station further comprising a spring located between said receiving unit and said side wall of said base for biasing said portion of said receiving unit toward said end of said flexible element of said pivot connector.

8. The recharging base station system as claimed in claim 7, wherein said base station further comprising a spacer located between said side wall of said base and said spring, and wherein said spring and said spacer are configured to receive said flexible element of said pivot connector through said spring and said spacer.

9. The recharging base station system as claimed in claim 2, wherein said DIN rail assembly comprises of a cover strip and a lower DIN rail.

10. The recharging base station system as claimed in claim 9, wherein said cover strip comprises of at least one connection member configured to couple with said base of said base station, and at least one opening defined through said connection member configured to allow said base electrical contact to contact said power connection element of said DIN rail assembly.

11. The recharging base station system as claimed in claim 10, wherein said cover strip further comprising a top side and a pair of cover strip side walls extending from opposite ends of said top side, at least one of said cover strip side walls includes at least one latch tab extending exteriorly outward therefrom, and wherein said lower DIN rail comprises of a main web, and a pair of flanges extending from opposite ends of said main web, at least one of said flanges includes an opening defined therethrough configured to receive said latch tab of said cover strip when said cover strip is received between said flanges of said lower DIN rail.

12. The recharging base station system as claimed in claim 9, wherein DIN rail assembly further comprising an inner strip located between said cover strip and said lower DIN rail, said inner strip is in electrical communication with said power connection element of said DIN rail assembly and the power supply.

13. The recharging base station system as claimed in claim 7, wherein said cover strip further comprising a top side and a pair of cover strip side walls extending from opposite ends of said top side, said side walls each comprises of a lip extending toward each other, said lips are configured to receive and retain said inner strip between said top side and said lips.

14. The recharging base station system as claimed in claim 9, wherein said cover strip includes a first end and a second end, said first end includes at least one detent extending outwardly from said first end, said second end include at least recess configured to receive a detent of a first end of an adjacent cover strip.

15. The recharging base station system as claimed in claim 2, wherein said base electrical contact is a prong, and said power connection element is a biased clip configured to receive said prong.

16. The recharging base station system as claimed in claim 15, wherein said base of said base station further comprising a moveable prong cover plate slidably received in a recess defined in said base, said moveable prong cover plate is configured to expose said prong when a male connection member of said DIN rail assembly is received in said recess of said base, wherein said biased clip is located in an interior of said male connection member.

17. A recharging base station system comprising:
a rail assembly comprising:
 a cover strip having at least one connection member, said connection member having at least one opening defined therethrough;
 at least one power connection element in electrical communication with a power supply; and
 a lower rail attachable with said cover strip; and
at least one base station removably attachable to said cover strip of said rail assembly, said base station being in electrical communication with said power connection element of said rail assembly, said base station comprising:
 a base having at least one side wall extending away from said base;
 a receiving unit rotatably connected to said side wall of said base, said receiving unit having an opened end configured to receive a rechargeable element, and at least one receiving unit electrical contact configured to contact a portion of the rechargeable element when the rechargeable element is received in said receiving unit, said receiving unit electrical contact being in electrical communication with said power connection element of said rail assembly; and
 at least one battery in electrical communication with said receiving unit electrical contact;
wherein said connection member of said cover strip being configured to couple with said base of said base station;
wherein said opening of said connection member being configured to allow said base electrical contact to contact said power connection element of said rail assembly.

18. The recharging base station system as claimed in claim 17, wherein said rail assembly further comprising an inner strip located between said cover strip and said lower rail, said inner strip is in electrical communication with said power connection element of said DIN rail assembly and the power supply.

19. The recharging base station system as claimed in claim 17, wherein said base station further comprising:
a pivot connector having a portion received through said side wall of said base and into said receiving unit, said pivot connector is configured for rotatably coupling said receiving unit with said side wall of said base, said pivot connector comprises of at least one flexible element having an end configured to retain a portion of said receiving unit; and
a spring located between said receiving unit and said side wall of said base for biasing said portion of said receiving unit toward said end of said flexible element of said pivot connector.

20. The recharging base station system as claimed in claim 17, wherein said lower rail is a DIN rail having a main web and a pair of flanges extending from edges of said main web, said flanges being configured to receive said cover strip therebetween.

* * * * *